United States Patent [19]

Schüttler

[11] Patent Number: 5,620,066

[45] Date of Patent: *Apr. 15, 1997

[54] LOCKING DEVICE FOR SECURING OBJECTS WHICH ARE MOVEABLE RELATIVELY TO ONE ANOTHER

[75] Inventor: Oliver Schüttler, Monreal, Germany

[73] Assignee: Stabilus GmbH, Koblenz-Neuendorf, Germany

[*] Notice: The term of this patent shall not extend beyond the expiration date of Pat. No. 5,450,933.

[21] Appl. No.: 498,044

[22] Filed: Jul. 5, 1995

Related U.S. Application Data

[63] Continuation of Ser. No. 213,692, Mar. 15, 1994, Pat. No. 5,450,933.

[30] Foreign Application Priority Data

Mar. 18, 1993 [DE] Germany .......................... 43 08 669.1
Aug. 11, 1993 [DE] Germany .......................... 43 26 968.0

[51] Int. Cl.⁶ .................................................. F16F 9/32
[52] U.S. Cl. .................................... 188/300; 267/64.12
[58] Field of Search ...................... 267/64.12; 188/300, 188/269, 322.15, 280; 296/56, 57.1, 66, 84, 51, 52, 58

[56] References Cited

U.S. PATENT DOCUMENTS

| | | | |
|---|---|---|---|
| 2,782,877 | 2/1957 | Crabtree | 188/88 |
| 3,236,515 | 2/1966 | Ackerman | 267/71 |
| 4,099,602 | 7/1978 | Kourbestos | 188/300 |
| 4,973,097 | 11/1990 | Hosan | 296/76 |
| 5,116,028 | 5/1992 | Mintgen | 267/64.12 |

FOREIGN PATENT DOCUMENTS 2594473  8/1987  France .
1459182  1/1969  Germany .
2927621  3/1981  Germany .
3519203  7/1986  Germany .
3602405  7/1987  Germany .
4007162  9/1991  Germany .
4140197  6/1993  Germany .
4239172  12/1993  Germany .
3168432  7/1991  Japan .

*Primary Examiner*—Robert J. Oberleitner
*Assistant Examiner*—C. T. Bartz
*Attorney, Agent, or Firm*—Brumbaugh, Graves, Donohue & Raymond

[57] ABSTRACT

A locking device for selectively securing two movable objects in desired positions relative to each other includes a cylinder and a piston movable within the cylinder and defining first and second working chambers of variable volumes. A fluid exchange connection provided on the piston includes a flow chamber having openings that communicate with the working chambers. A valve body slidably received on the piston in sealed relation is biased by a spring into a position closing the opening from the flow chamber to first working chamber. When the fluid pressure in the second working chamber exceeds a predetermined amount and acts on the valve body, the valve body is moved against the spring bias and opens to allow fluid to flow through the fluid exchange connection. In the open position, a larger area of the valve body is exposed to the pressure in the second chamber. A restriction in the flow path between the flow chamber and the first chamber produces a pressure drop between the flow chamber and the first chamber and allows the fluid exchange connection to remain open with a reduced pressure in the second chamber. The device thus provides for a large holding force when the valve body closes the opening and a small resistance to movement after the valve body is moved from closed. By providing two spring-biassed valve bodies acting in opposed directions, control of movements of objects in opposite directions is obtained.

22 Claims, 6 Drawing Sheets

LOCKING DEVICE FOR SECURING OBJECTS WHICH ARE MOVEABLE RELATIVELY TO ONE ANOTHER

This application is a continuation of application Ser. No. 08/213,692, filed on Mar. 15, 1994 U.S. Pat. No. 5,450,933.

BACKGROUND OF THE INVENTION

The invention relates to a locking device for securing against external forces two objects adapted for movement relatively to each other, in two opposite directions of movement, the locking device generating in both directions of movement a restraining force counteracting the initiation of movement and—smaller compared with the restraining force—a movement resistance counteracting continued movement, whereby this locking device is furthermore constructed with, adapted for movement relative to each other, two locking device sub-assemblies of which one is coupled to one of the objects and another is coupled to the other of the objects, whereby furthermore due to the relative movement of these locking device sub-assemblies at least two variable-volume working chambers containing a working fluid can in the size of their respective working volume, be so influenced that the volumetric ratio of these working chambers .changes in opposing senses as a function of the direction of movement, whereby furthermore these working chambers -are connected to each other by a fluid exchange system which allows an exchange of fluid between the two working chambers in both exchange directions, in fact so that the resistance to fluid through flow during a fluid exchange process is greater at the start thereof than during its further progress.

STATEMENT OF THE PRIOR ART

Such a locking device is known from DE-C-1 459 182, in particular for securing doors and windows.

In the case of the known locking device, a piston rod is passed in sealing-tight manner through end of a cylinder which is closed at both ends. Inside the cavity in the cylinder, the piston rod is connected to a separating piston which separates two working chambers from each other. The two working chambers are connected to each other by two flow paths which extend inside the piston. Associated with each direction of movement is a non-return valve which can only open in one direction of flow. Each non-return valve comprises a valve body which is pretensioned by a pretensioning spring in the shut-off position so that it is biased against an incoming flow aperture, closing this off in respect of the cylinder when the piston rod is stationary. When the piston rod is moved in a specific direction of movement in respect of the cylinder, then an above-atmospheric pressure builds up in one of the working chambers. This overpressure acts on one of the non-return valves, opening it. When the piston rod starts to move, this pressure acts initially on just a small area of the valve body which is determined by the cross-section of the inlet aperture associated with this valve body. By reason of the smallness of this cross-section of the inlet aperture, a considerable above-atmospheric pressure is needed in the working chamber in order to lift the valve body off the sealing position in respect of the inlet aperture. Only then can there be flow between the two working chambers. Once the valve body has lifted off the inlet aperture, then it offers to the pressure in the diminishing working chamber a greater surface area on which to act so that it can be maintained in the open position at a relatively small level of over-pressure in the working chamber concerned. For details of this, reference is made to the comments made on lines 42 to 67 of column 6 of DE-C-1 459 182.

The prior art solution makes it possible to lock a door in a relatively stable fashion in any desired position between its open and its closed positions. A relatively considerable pushing force is needed for a door or the like which is secured in any desired position to start to move.

Therefore, any unintentional shock will not cause the door to change its position. On the other hand, once the door has been set in motion, a relatively minor amount of effort is sufficient to open or close it further.

This per se advantageous behaviour of the door is certainly achieved at the expense of considerable structural cost which has hitherto prevented a wider application of the principle. The structural expenditure is caused particularly because two flow paths have to be made between the two working chambers. The provision of these two flow paths requires a multiplicity of bores, including axial bores, needed for forming the flow paths and which have to be disposed eccentrically in the piston.

With regard to the state of the art, reference may also be made to U.S. Pat. No. 4,099,602 which is also concerned with door stays, particularly on motor vehicles. Also where these door stays are concerned, the locking action is generated solely by hydraulic means. In order to maintain a constant volume inside a cylinder, i.e. in order to maintain a constant sum of the working spaces in the two working chambers, a piston-piston rod unit is provided, in which the piston rod consists of two piston rod portions emanating from the piston and in opposite directions and which are passed in sealing-tight manner through two oppositely disposed end walls of the cylinder. Also this construction is based on the use of two flow paths through the piston, each associated with one direction of movement between cylinder and piston rod, so that the construction is correspondingly involved. Furthermore, this construction has the disadvantage that even after initiation of a movement of the piston rod in relation to the cylinder the external pushing force needed to open the relative non-return valve has to be maintained for the movement to continue over a relatively great distance. Therefore, the only choice open is so to dimension the non-return valves that a relatively low pushing force is sufficient to open them. This results in the disadvantage that even relatively minimal and unintentional pushing forces suffice to set the door in motion unintentionally. If one wishes to prevent this, then the non-return valves can be so adjusted that they can only be opened by a relatively considerable pushing force. However, this entails the disadvantage that a resistance to movement corresponding to this pushing force has to be overcome over the entire intended path of movement.

OBJECT OF THE INVENTION

The invention is based on the problem of indicating a locking device which, while retaining the advantageous operating behaviour of a looking device according to the principle outlined in DE-C-1 459 182, i.e. an operating behaviour in which after a relatively stronger pushing force, further continuance of a door movement generates a relatively low resistance to movement, allows a simplified structural complication so that it is therefore suitable for mass production.

SUMMARY OF THE INVENTION

In order to resolve this problem, it is according to the invention proposed for a locking device as defined in the background of the invention that the fluid exchange system comprises a series connection of two throttle means which are pretensioned into a closed position and through which flow is possible in both directions, each throttle means with a first through flow connection in conjunction with an associated working chamber and with a second through flow connection in conjunction with the second through flow connection of whichever is the other throttle means. A first pressure value at the first through flow connection of a throttle means is sufficient to open both throttle means and a second lesser pressure value at the first through flow connection of this throttle means is sufficient to maintain both throttle means open with continued through flow.

By virtue of the fact that in the case of the embodiment of fluid exchange system according to the invention the two throttle means are connected in series with each other, the disposition of the bores inside a fluid conducting body accommodating the bores and forming the fluid exchange system can be substantially simplified.

The locking device according to the invention can be used for the most widely diverse purposes, including the securing of doors and windows on buildings and movable objects such as motor vehicles. In that case, not only linear movements but for instance also rotary movements are involved. In the case of arresting linear movements, whereas it is possible to work particularly with linearly movable cylinder-piston units, in which the cylinder constitutes one sub-assembly of the locking device while the piston rod and piston represent the other, it is readily conceivable for the principle of the invention also to be applicable to rotary piston units in which the working chambers in a stator-cylinder are separated from each other by a rotor-piston.

It is possible to take symmetrical and asymmetrical working conditions into account by a corresponding design of the throttle means. For example, it is conceivable for the first pressure value to be the same for both throttle means; this means that the same degree of pushing force (a pushing moment of equal magnitude) is needed in order even to initiate a movement in either direction. It means furthermore than then the stability of whichever setting is selected is of equal magnitude in relation to an unintentional pushing pulse in both directions. On the other hand, if it is desired to maintain the stability against unintended pushing greater in one direction because for instance the risk of pushing pulses arising are substantially greater for this direction of movement than for the other, then it is also possible for the first pressure value to be varied accordingly for the two throttle means. This, then, provides the advantage that the danger of unintended displacement due to a pushing pulse in one direction is reduced, in other words particularly in that direction in which unintentional pushing pulses are expected with greater probability and on the other hand it offers increased operating convenience in so far as it is possible more easily to initiate an intentional movement in the other direction of movement in which an unintentional pushing pulse is less likely.

Also the second pressure value can be the same or different for both throttle points. Consequently, this can be used for instance in order to influence the user behaviour. For example, if it is desired to cause the user to keep a door only sufficiently open in the direction of opening as is absolutely necessary in order for instance to minimize the possible effect of wind, and if on the other hand one wishes to induce the user to close the door again as far as possible "willingly", then the second pressure value for the throttle determining the resistance to movement in the opening direction of the door can be made greater than the throttle determining the second pressure value for the resistance to movement when closing the door. By the asymmetry of the first and second pressure values, it is possible also to allow for situations where the relative movement of the object in a specific direction of movement is assisted also by other permanently acting forces, in other words for example the force of gravity, in fact so that the restraining force countering the movement in the direction of the force of gravity and/or the resistance to movement counteracting the movement in the direction of the force of gravity are greater than restraining force and/or resistance to movement for the movement directed in opposition to the force of gravity.

In accordance with a preferred connection solution as a means of carrying out the principle underlying the invention, a throttle means comprises a through flow chamber with a first and second through flow connection and, adapted for movement along a movement path and adjacent this through flow chamber a throttle member which seals the through flow chamber, whereby the throttle member is pretensioned into a closed position by the action of pretensioning means, in which closed position the second through flow connection is isolated from the through flow chamber, whereby furthermore the first through flow connection is constantly connected to the through flow chamber whereby further in the closed position of the throttle member this latter offers a smaller working surface to a fluid pressure prevailing at the second through flow connection and a larger working surface in the same direction of exposure to a fluid pressure prevailing in the through flow chamber, whereby a pressure drop path being provided between the through flow chamber of the throttle means and the associated working chamber which is connected thereto via the first through flow connection. Such a connection arrangement gives rise to the following behaviour: when the pressure in one working chamber is increased, then a pressure builds up in a through flow chamber which is constantly connected to this working chamber via a first through flow connection. This pressure acts on a relatively large operating surface area of the throttle member adjacent this through flow chamber. Therefore, at a relatively low pressure in the through flow chamber associated with it, this throttle member yields and opens the second through flow connection of this through flow chamber. Consequently, the pressure out of this through flow chamber is also transmitted to the second through flow connection of the through flow chamber of the other throttle means. However, it is still unable to lift the throttle member of this other throttle means off the second through flow connection of the through flow chamber of the other throttle means. Only when a predetermined movement initiating force is exerted does the pressure in the working chamber provided for diminution become sufficiently great that the pressure in the second through flow connection of the through flow chamber associated with the other throttle means is sufficient to lift the throttle member of the other throttle means off the second through flow connection of the associated through flow chamber. Then pressure is also applied to the larger operating surface area of the throttle member of the other throttle means and this application of pressure lasts as long as, due to a further movement, there is a drop in pressure on the way from the through flow chamber of the other throttle means to the then enlarging working chamber.

The pressure drop path can for instance consist of the cross-sectional setting of whichever is the first through flow connection. In this way, simple dimensioning of a bore makes it possible to adjust the pressure drop in the pressure drop path in keeping with whatever operating pattern is desired.

It serves the object of a simple construction fluid exchange system within a fluid conducting member if the second through flow connections of the two throttle means are formed by the ends of a connecting passage which connects the two throttle means in series with each other.

The two throttle means can be accommodated in a common fluid connecting member, again with the object of achieving the simplest possible fluid conducting member which is suitable for mass production. In this respect, the through flow chambers of the two throttle means can be coaxially disposed in the fluid conducting member and separated from each other by a separating wall which is traversed by a connecting passage which connects the through flow chambers of the two throttle means. The mouths of the connecting passage into the through flow chambers are then formed by the second through flow connections of the two throttle means.

According to a preferred application of the invention, one locking device sub-assembly is constructed as a cylinder while the other is constructed as a piston rod unit with a separating piston between the two working chambers. In this case, then, the fluid conducting member in which the throttle means are accommodated can be a part of the piston rod unit and in particular it can be at least partly constituted by the separating piston in which relatively considerable space is available to accommodate the bores of the fluid exchange system, even if the overall device which is the locking unit has to be situated in the minimum of space by virtue of the application.

For example, it is possible to accommodate in one separating piston member of a separating piston throttle member accommodating chambers for each of the two throttle means substantially concentrically with each other. These chambers can be separated from each other by a one-piece separating wall of the separating piston member. In this respect, the remote ends of these throttle member accommodating chambers can each be occluded by a plug. The plugs are fixed in the separating piston member. At least one of the plugs may be constituted by a piston rod portion. In this way, the separating piston can be constructed on the basis of a simple rotary part, sealing of the throttle member accommodating chamber taking place at the same time as the connection is established between the separating piston and the piston rod. In the case of this embodiment, the inlet chamber of a throttle means inside the throttle member accommodating chamber is defined by the throttle member and the separating wall.

The plugs can be inserted into extensions of the throttle member accommodating chambers and fixed therein for example in that the extensions of the throttle member accommodating chambers have a larger diameter than the throttle member accommodating chambers themselves and in that the plugs each abut in an axial direction a transition shoulder between a throttle member accommodating chamber and its extension. In this respect, the plugs can be fixed in the extensions of the throttle member accommodating chambers by a deformation of the separating piston member, possibly by a flanging-over process. In this way, it is possible to obtain a sealing-tight closure of the throttle member accommodating chamber by the respective plug. Such a seal may be essential in order to avoid pressurized medium being applied to the back of the throttle member which would cause disturbances in the working cycle.

The first through flow connections of the through flow chambers may be formed by radial bores in the separating piston member; these radial bores can then open out into annular spaces formed between a respective end portion of the separating piston member and an inner peripheral surface of the cylinder.

In order to prepare these annular spaces and provide favourable fitting conditions for the separating piston within the cylinder, the separating piston member can be made so that midway along it in the axial direction of the cylinder there is a thickened portion which bears on an inner peripheral surface of the cylinder, possibly through an interposed gasket arrangement.

With an eye to achieving minimal overall size, the pretensioning means acting on a throttle member housed in the respective throttle member accommodating chamber can be at least partially accommodated within the respective plug. This is particularly true in cases where the pretensioning means consist of elongate coil thrust springs which can be easily housed within a bore in the respective plug or respective piston rod. In this way, relatively long coil thrust springs can be used which have a virtually linear characteristic. Such a linear characteristic can be easily obtained in that in order to generate a specific pretensioning force, there is not used a correspondingly strong coil thrust spring, i.e. one which even after the shortest deformation path exhibits a correspondingly great and then further increasing restoring force. Instead, a long and weak spring is used which in the non-tensioned state has a substantially lower spring constant than corresponds to the desired pretensioning force, this coil thrust spring then, during installation, being subject to a pretension which is always present in the shut-off position and which corresponds to the desired pretension on the throttle member. In this case, the spring force of the coil thrust spring changes only slightly when the throttle member is lifted out of the position which produces a closure of the second through flow connection, so that upon continued movement, the resistance to movement can be kept even less.

The working chambers can be bridged in one or more portions of the relative path of movement by a fluid by-pass. Thus one obtains this peculiarity: by virtue of such a fluid by-pass, the fluid exchange system containing the series-connection throttle means is short-circuited, i.e. a fluid exchange can take place between the two working chambers without the flow resistance in the fluid exchange system becoming effective. This means that the movement can be performed with even less force than that which corresponds to the per se already reduced resistance to movement. When a door is closed, it may be necessary to apply a specific minimum approach speed in order to engage certain closure means such as are used for instance in the case of motor car doors in order to cause the locking means to engage. In order to be able to attain this minimum approach speed to the closed position without regard to the resistance to movement which still exists during continued movement of the door stay or locking device, particularly if the door had been secured in such a position that it was only open a short distance and from which only a minimal path is available in order to achieve the minimum approach speed, then the use of a fluid by-pass may be a great help. By reason of such a fluid by-pass, the arresting effect of the locking device is not essentially restricted, because this fluid by-pass can be confined to a partial path in which there is no need for the locking effect in any case.

Furthermore, the locking device can be combined with an electrical switch intended and suitable for instance for switching a room lighting source on and off where the room is to be closed by a door provided with the locking device. This has the advantage that the switch can be mounted in the same structural unit as the locking device. Mounting it on the locking device at the workshop where the latter is manufactured, using the assembly means available there, is extremely simple and entails a favourable cost. On the other hand, the need to install the switch on the structure to be equipped with the locking device is avoided, i.e. one working operation can be dispensed with in a production stage in which it is very much more difficult to have available suitable mechanical aids to install a light switch.

The relative area of movement can be limited by flexible abutment means at least at one end. In the case of a car door, in particular, a resilient end stop is provided to define the opening, since as the door approaches the closed position, the locking means may be expected to provide a damping action.

Basically, the fluid may be liquid or gas. If the working medium used is liquid, then care must be taken to ensure that the total space available within the working chambers can be varied by the longer or shorter immersion length of a piston rod and to see that this variation is taken into account. In principle, it is possible by having a small piston rod cross-section to minimize the variations in volume as a function of the piston rod immersion length in the cylinder, making them in some cases even so small that a very slight underfilling of the working chambers is sufficient for compensation although in such a case a certain backlash must be anticipated in whichever position is selected. However, it is also possible to continue the piston rod unit beyond the two ends of the separating piston in which case the piston rod can then be passed in sealing-tight manner through respective bushings at both ends of the separating piston. In this way, the space available in the working chambers is constant regardless of the piston rod position. In that case, however, certain compensating means are needed in order to allow for fluctuations in temperature and any leakage losses. Such compensating means might be provided by bounding one of the working chambers by a closure wall braced by a hard springing means.

A double piston rod with two passages through corresponding working chamber end walls is not absolutely vital. If one wishes to dispense with extending the piston rod through a second working chamber end wall, then the compensation of volume can also be achieved by providing adjacent at least one of the working chambers a flexible compensating space which may be separated from the liquid space by a partition. In such a case, a valve wall can be provided between the partition and the separating piston which sub-divides the respective working chamber into two partial working chambers and contains two oppositely poled non-return valves. Of these oppositely poled non-return valves, that which leads from the partial working chamber which is closer to the separating piston to the partial working chamber which is more remote from the separating piston is pretensioned by a relatively strong pretension in the direction of closure. This pretension then ensures that in the inoperative position of the device, considerable pushing force is needed in order to initiate the movement. Once the movement has been started, then only the piston rod has any volume-compacting effect. By reason of the hard sprung non-return valve, then, only a very small volumetric flow takes place. This small volumetric flow therefore suffers a relatively low resistance to through flow in the hard sprung non-return valve. In this way, once the movement has been initiated, the resistance to movement can always be kept sufficiently low.

From another point of view, the invention refers to a system for fluid exchange between two working chambers, particularly of a locking device which is constructed as a cylinder-piston unit, locking device in question being in particular of the type described hereinabove.

This fluid exchange system comprises a through flow chamber accommodated within a fluid conducting member, said through flow member being defined by a sealing piston disposed for movement within it, whereby furthermore this through flow chamber can be connected via a first connection to one working chamber, whereby furthermore a constantly open second connection of the through flow chamber leads to the other working chamber, whereby furthermore on the same side as the first connection, an end face of the sealing piston is pretensioned by a sealing piston pretensioning means into a closed position against the first connection, whereby furthermore the end face on the first connection side, when in the closed position, offers a smaller cross-section to the fluid acting on it through the first connection, and whereby the end face on the first connection side offers a larger fluid actuating cross-section to a fluid pressure prevailing in the through flow chamber.

Such a fluid exchange system is in turn known from the already above-mentioned U.S. Pat. No. 4,099,602 in fact from FIG. 2 thereof. In the case of this known construction, there are two sealing pistons disposed inside the through flow chamber of the fluid conducting member. A closed spring chamber is constructed between these sealing pistons. This spring chamber accommodates a coil thrust spring which spreads the two sealing pistons apart from each other. Each of the two sealing pistons carries a ball on the side remote from the spring chamber. This ball co-operates with respective first connections and forms the smaller fluid-actuated cross-section of a respective end face on the same side as the first connection. Therefore, each ball co-operates with a first connection. The two sealing pistons have a diameter which exceeds the ball diameter so that a larger fluid exposed cross-section is available also at the respective sealing piston. The two first connections of each through flow chamber are respectively connected to a working chamber. Furthermore, the second connection of each through flow chamber is connected by a pipe to whichever is the other working chamber. When the pressure in one of the two working chambers rises, this increased pressure is on the one hand applied via the first connection to the associated small fluid-exposed cross-section of the sealing piston associated with this one through flow chamber and furthermore it is applied via the second connection to the other through flow chamber at the larger fluid-exposed cross-section of the other sealing piston associated with this other through flow chamber. Therefore, this over-pressure in one working chamber can open two mutually parallel flow paths in the direction of the other working chamber. The resulting resistance to through flow through these two parallel connected flow paths depends upon the spring force and furthermore upon the smaller fluid-exposed cross-section of one sealing piston and the larger fluid-exposed cross-section of the other sealing piston. With increasing pressure in one working chamber, firstly the sealing piston of the other through flow chamber will be lifted off its first connection. Identical circumstances arise when the pressure rises in the other working chamber.

A locking device in the form of a cylinder-piston unit is known from DE-C-1 459 182. In this case, the fluid conducting member in the form of a separating piston unit is mounted on the piston rod of the cylinder unit, between two working chambers of the cylinder-piston unit. Upon displacement of the piston rod in respect of the cylinder of the cylinder piston unit, according to the direction of displacement, a pressure rise occurs in one or other of the working chambers. Now, once again, two through flow chambers are formed in the fluid conducting members and each of these two through flow chambers accommodates one throttle piston. Each of the working chambers is connected to an associated through flow chamber via a first connection. The relevant first connection can be occluded by the throttle piston so that the pressure in the respective working chamber acts via the first connection on the smaller fluid-exposed cross-section of whichever is the relevant throttle piston. Each throttle piston is pretensioned by a coil thrust spring in the direction of the first connection of the associated through flow chamber. The throttle piston does not seal the through flow chamber but allows a very restricted connection between the respective through flow chamber and a back of the respective throttle piston. If in one of the working chambers an over-pressure occurs due to its becoming smaller, then via the associated first connection, this increased pressure is transmitted via the associated first connection to the smaller fluid-exposed cross-section of the associated throttle piston so that this throttle piston lifts off the first connection. From that point on, the fluid of this working chamber acts on a substantially enlarged fluid-actuated cross-section of the throttle piston in fact because a pressure drop takes place between the respective through flow chamber and the other working chamber. This means that once the first connection has opened, the piston rod can be displaced smoothly in respect of the cylinder. Furthermore, this means that in the case of a use of the piston-cylinder unit as a locking device for a door, once the door has been pushed, it will move relatively easily against the action of the locking device.

The symmetry of the separating piston unit ensures substantially symmetrical conditions so that the arresting or locking behaviour is substantially the same regardless of the direction in which the door is moved.

The invention is based on the problem of, on the premise of the structural principle according to U.S. Pat. No. 4,099,602, obtaining a fluid exchange system which provides a similar flow characteristic to the fluid exchange system according to DE-C-1 459 182.

In order to resolve this problem, it is according to the invention proposed to associate with the second connection a pressure drop path and that a flow path extending from the first connection towards a second connection is by-pass free when there is a flow in this direction so that for a predetermined minimum pressure acting on the smaller fluid-exposed cross-section the end face on the same side as the first connection lifts off the first connection and subsequently the large fluid-exposed cross-section inside the through flow chamber is exposed to a pressure which is dependent upon the flow rate through the through flow chamber and keeps the first connection open until there is a short fall on a predetermined minimum through flow rate.

In accordance with a preferred embodiment, the fluid conducting member is accommodated within and substantially concentrically with a cylindrical cavity, the first connection, extending in the direction of the axis of the cylindrical cavity, communicating with a first connection chamber inside the cylindrical cavity, this first connection chamber being in turn connected to one working chamber or forming such a working chamber and whereby furthermore the second connection is disposed substantially radially in respect of the axis of the cylindrical cavity and being connected to a connecting line which—extending preferably annularly cylindrically between the fluid conducting member and an inner peripheral surface of the cylindrical cavity—leads to the other working chamber. In this respect, the pressure drop path may be constituted by the second connection itself which is constructed as a bore. This last-mentioned construction has over the construction according to DE-C-1 459 182 the great advantage that the pressure drop at the bore can be very accurately established by corresponding calibration of this bore so that also the behaviour of the fluid exchange system can be adjusted with corresponding accuracy and at a reasonable production cost.

The first connection and the second connection can be separated from each other by an annular gasket which is formed between an outer peripheral surface of the fluid conducting member and an inner peripheral surface of the cylindrical cavity.

In order to achieve a compact structural design, it is recommended to dispose the fluid conducting member inside a separating piston unit which is disposed within a cylindrical tube.

The sealing piston pretensioning means can be formed at least partly by a coil thrust spring. The sealing piston pretensioning means can be accommodated in a closed chamber constructed inside the fluid conducting member. The pretension can however also be set up in that the sealing piston pretensioning means is at least partly derived from a fluid pressure in the other working chamber.

In contrast to the fluid exchange system according to DE-C-1 459 182, the fluid exchange system according to the invention is suitable for through flow in opposite directions whereby in a first through flow direction the first connection acts as an input while the second connection serves as an output while in a second direction of through flow the second connection serves as an input and the first connection serves as an input of the fluid exchange system.

If it is desired to achieve different flow conditions according to the direction of flow between the two working chambers, then it is possible for the flow from the first to the second working chambers to use a fluid exchange system described hereinabove and for a fluid flow in the opposite direction, i.e. from the other working chamber into the one working chamber, to use a simple differential pressure dependently opening non-return valve.

The non-return valve can thereby be constructed as a slide valve, in which case the fluid conducting member may be constructed as a valve slide member within a cylindrical cavity being pretensioned into a closed position and being capable of being moved into an open position by a pressure derived from the pressure in the other working chamber.

In particular, the fluid exchange system according to the invention can be accommodated within a separating piston unit of a cylinder-piston unit and may within the cylinder isolate two working chambers from each other. Care must be taken that already in the case of a single fluid exchange system of the aforementioned type a differing flow behaviour is achieved according to the direction of movement between piston rod and cylinder tube because in one direction of movement initially only the smaller fluid-exposed cross-section and only after opening of the first connection also the larger fluid-exposed cross-section will be acted upon whereas in the other direction of movement the larger fluid-actuated cross-section will be acted upon at the same time.

According to a further embodiment of a cylinder-piston unit, it is envisaged that there are within the separating piston unit two fluid exchange systems between the working chambers of the cylinder-piston unit, being connected in series, in fact so that the first connections of the two fluid exchange systems are connected to each other while the second connections of the two fluid exchange systems are each connected to a working chamber of the cylinder-piston unit. With this configuration, for a corresponding dimensioning, the through flow behaviour is respected, according to the direction.

The embodiment with two series-connected fluid exchange systems is preferably used in the case of cylinder-piston units in which the separating piston unit is accommodated inside a tubular cavity which is closed at both ends by a guiding and sealing unit, a piston rod connected to the separating piston unit being passed in sealing-tight manner through one of the guide and sealing units, a piston rod extension piece connected to the separating piston unit being passed through the other of the guide and sealing units. In the case of such an embodiment, it is possible to establish entirely symmetrical operating conditions in both directions of movement.

In the case of another embodiment of cylinder-piston unit, the separating piston unit is disposed inside a tubular cavity sealed at one end over its entire cross-section while a guiding and sealing unit is only provided at the other end, a piston rod connected to the separating piston unit being passed through the guiding and sealing unit, measures being taken to compensate for the variation in the displacement volume of the piston rod inside the cylindrical cavity upon a displacement of the piston rod in respect of the tubular cavity, generating a push-out force which acts on the piston rod. With this embodiment, too, a single fluid exchange system or a series arrangement of fluid exchange systems may be used. As a way of compensating for the variation in the displacement volume of the piston rod inside the cylindrical cavity when there is a displacement of the piston rod in respect of the cylindrical cavity, it is possible for the fluid filling to be constituted entirely by a compressible gas. Furthermore, it is possible for the cylindrical cavity to be partly filled with pressurized gas whereby in this case a floating piston or a separating diaphragm may be provided between the pressurized gas and the fluid. Finally, it is also conceivable to dispose at a fluid-filled part of the cylindrical cavity a floating piston which acts against the fluid by spring pressure.

In the case of a cylinder-piston unit with a piston rod lead-through at only one end, in a state of equilibrium there is a greater pressure in that working chamber of the cylinder cavity which is at the same end as the piston rod and a lower pressure in the working chamber which is remote from the piston rod, regardless of whether the cylinder cavity is filled with pressurized gas or with a liquid which is in turn subject to gas pressure or spring pressure. If it is desired to use approximately the same forces to push the piston rod in or out, as is frequently desirable for instance if the cylinder-piston unit is to be used as a locking device for securing motor car doors, then it must be borne in mind that during closure of the door, a push-out force acts on the piston rod which emanates from the gas pressure or the fluid pressure. This means that pushing it in, corresponding substantially to closing the door, means that a greater force must be exerted than that which is needed to push out or in fact open the door. Nevertheless, in order to achieve at least approximately compensated movement conditions during opening and closing, when there is only a single fluid exchange system inside the separating piston unit its first connection can be connected to a working chamber of the cylinder cavity which is on the piston rod side—this working chamber on the piston rod side will be referred to hereinafter as the rod chamber—while on the other hand a second connection of this fluid exchange system can be connected to a working chamber of the cylinder-piston unit which is remote from the piston rod and which is hereinafter referred to as the end chamber.

If the end chamber and the rod chamber are both filled with a fluid and one of these chambers, for example the end chamber, has next to it a flexible gas filling bounded by a floating piston, then the movement behaviour of the piston rod is influenced accordingly, in fact in that the piston rod is able to move away resiliently in the direction of the floating piston. If this is to be avoided—subject to the end chamber abutting the floating piston—the end chamber can be subdivided into a partial end chamber on the piston rod side and a partial end chamber which is remote from the piston rod, a further fluid exchange system of the aforedescribed type being installed in a stationary partition, in fact in such a way that its first connection communicates with the partial end chamber which is close to the piston rod.

If a cylinder piston unit is provided as an aid to lifting a structural part, for example a boot lid of a motor vehicle, then it is preferable to use an embodiment which has only one cylindrical tube end fitted with a lead-through for the piston rod, a hollow piston member being provided as part of the separating piston unit, which bears in sealing-tight manner against an inner peripheral wall of the cylinder cavity. Furthermore, the fluid conducting member of the fluid exchange system is also accommodated in this hollow piston member, in fact in such a way that the first connection of the through flow chamber communicates with a working chamber, referred to as a rod chamber, on the same side as the piston rod and in such a way that the fluid conducting member co-operates with the hollow piston member as a valve slide, forming a non-return valve which leads to the rod chamber from a working chamber of the cylinder cavity which is remote from the piston rod and which is referred to as the end chamber.

In accordance with a further aspect, the invention relates to a structural sub-assembly comprising a basic structure and a movable structural element which is adapted for movement against the force of gravity between an extreme low position and an extreme upper position in relation to the basic structure, being guided by guide means, whereby to facilitate movement of the movable structural element between the extreme low position and the extreme high position and in order to arrest the movable structural element in intermediate positions, at least one cylinder-piston unit filled with a pressurized fluid is provided, whereby furthermore this cylinder-piston unit is constructed with a cylindrical tube, a tubular cavity constructed inside this cylindrical tube, a guiding and sealing unit at one end of the tubular cavity, a sealing-tight closure at the other end of the tubular cavity, a piston rod inserted through the guiding and sealing unit, a separating piston unit connected to the piston rod inside the tubular cavity, a rod chamber on the piston rod side of the separating piston unit, an end chamber on the side of the separating piston unit which is remote from the piston rod and a filling of pressurized fluid in the rod chamber and in the end chamber. Measures are taken to compensate for variations in the displacement volume of the piston rod inside the tubular cavity upon displacements of the piston rod in relation to the tubular cavity, which measures generate a push-out force on the piston rod.

A fluid exchange system is provided between the rod chamber and the end chamber. Of the two parts: cylindrical tube and piston rod, one is connected to the basic structure while the other is connected to the movable structural element. The weight of the movable structural element, the guide means of the movable structural element, the points of attack between the piston cylinder unit, the basic structure and the movable structural element, the cross-section of the tubular cavity, the cross-section of the piston rod, the fluid filling in the tubular cavity and the fluid exchange system are so constructed and dimensioned that the following conditions are satisfied:

a) when the movable structural element is in a midway position, at rest, the end chamber and the rod chamber are separated from each other and the movable structural element is secured against sinking by an end chamber fluid contained in the end chamber and against rising by a rod chamber fluid contained in the rod chamber, in that aa) the pressure of the end chamber fluid bearing on a full cross-section of the separating piston unit exerts a push-out effect on the separating piston unit, ab) by this push-out effect in the rod chamber, a pressure of the rod chamber fluid is generated which acting on the differential cross-section between the full cross-section of the separating piston unit and a rod cross-section of the piston rod exerts a push-in effect on the separating unit, ac) the push-in effect generated by the rod chamber pressure, together with an additional push-in effect emanating from the weight of the movable structural element maintains equilibrium with the push-out effect, the pressure in the rod chamber being greater than the pressure in the end chamber, ad) a lifting-purpose non-return valve system opening from the rod chamber to the end chamber is exposed to the pressure in the rod chamber with a smaller fluid exposed cross-section and is so adjusted that in a state of equilibrium it cannot be opened by the pressure in the rod chamber, ae) a lowering-purpose non-return valve system opening from the end chamber to the rod chamber is exposed to the pressure in the end chamber and is so adjusted that in a state of equilibrium it cannot be opened by the pressure in the end chamber, b) a brief slight application of an external lifting force on the movable structural element results in an increase in the pressure in the rod chamber which acts on the small fluid exposed cross-section of the lifting-purpose non-return valve system which leads to an opening of the lifting-purpose non-return valve system;

ba) once the lifting-purpose non-return valve system is opened, there is a flow of fluid from the rod chamber to the end chamber;

bb) the flow from the rod chamber to the end chamber suffers a drop in pressure in a pressure drop path situated between the lifting-purpose non-return valve system and the end chamber, bc) as a result of this pressure drop, there is established inside the lifting-purpose non-return valve system an intermediate pressure which is greater than the pressure in the end chamber; this intermediate pressure acts on a larger fluid exposed cross-section of the lifting-purpose non-return valve system in the opening sense of the lifting-purpose non-return valve system; as a result of the fluid flow from the rod chamber through the lifting-purpose non-return valve system to the end chamber, the pressure in the rod chamber drops; the balance is modified and the piston rod is pushed out of the cylindrical tube;

bd) the pushing of the piston rod out of the cylindrical tube brings about a continued flow from the rod chamber to the end chamber; this continued flow continues to ensure maintenance of an intermediate pressure in the lifting-purpose non-return valve system; this inter-mediate pressure furthermore acts on the larger fluid exposed cross-section of the lifting-purpose non-return valve system and holds it open, even when the exertion of external lifting force ceases; the pushing-out movement of the piston rod and thus the raising of the movable structural element are therefore continued by the action of the cylinder piston unit, without the need for the continued application of an external lifting force;

be) if during the continued push-out movement of the piston rod a depressing force is briefly applied to the movable structural element, then the rate of flow through the lifting-purpose non-return valve system drops; the intermediate pressure acting on the larger fluid exposed cross-section of the lifting-purpose non-return valve system drops; the lifting-purpose non-return valve system is closed again; the movable structural element comes to a standstill and remains stationary even if the depressing force ceases again;

c) when the movable structural element is in an intermediate position and at rest, it can be moved by a minor lowering force in the direction of the extreme low position in that ca) firstly there is an increase in the pressure in the end chamber, a slight increase in the pressure in the end chamber leading to an opening of the lowering-purpose non-return valve system, cb) consequently there is an approximation of pressures between the end chamber and the rod chamber, cc) and the pressure acting on the piston rod cross-section and prevailing in the rod chamber and end chamber once this approximation of pressure is established between the two chambers produces a force to push the piston rod out and this force only slightly exceeds the gravity-induced piston rod push-in effect of the movable structural element on the piston rod, so that it can be overcome by said minor lowering force to be permanently applied until a desired lower position of the movable structural member, optionally its extreme low position, has been reached.

The structural sub-assembly can, particularly as a basic structure of a motor vehicle body and as a movable structural element, comprise a hinged member, for example a boot lid or a tail gate of an estate car or an engine bonnet.

The result then is that the hinged member can easily be raised by hand. Over a major part of its pivoting path it is automatically lifted by the cylinder-piston unit. It can be arrested in midway positions in that a brief depressing force is exerted on the hinged member and it then stays in the selected position even if this depressing force is removed again. If it is intended then to open the hinged member further, then a minimal and brief application of outside lifting force on the hinge member is sufficient to trigger its continued automatic opening until the hinged member comes to a standstill by reason of an abutment e.g. inside the cylinder piston unit or until once again a depressing force is provided by hand. If it is intended to close the hinged member, then it is sufficient to exert a relatively minor but steady lowering force on the hinged member until a desired lower position is reached. If, once this lower position of the hinged member is reached, the steady lowering force is removed, then the hinged member remains in the new midway position attained. If the hinged member is to be completely closed, then the steady lowering force is exerted until such time as the hinged member is either closed or until the push-out force on the rod is no longer sufficient to maintain balance against the force of the weight of the hinged member so that this drops down. Preferably, adjacent the position of complete closure of the hinged member, it is preferable to provide a small range of movement in which the push-in force exerted by the weight of the hinged member exceeds the push-out effect of the cylinder piston unit so that the hinged member is able easily to snap into place in the lock or, as desired, can automatically drop into the lock., The outside lifting force needed to trigger the outwards movement from a midway position of the hinged member, the depressing force needed to arrest the hinged member in a midway position and the steady lowering force needed to close the hinged member are preferably so adjusted that they can easily be applied by even a weak person. Preferably, these forces should be less than 100N and preferably less than 50N. The cylinder piston unit can thereby be substantially completely filled with gas plus a small quantity of liquid lubricant.

Furthermore, the piston cylinder unit can be partly filled with liquid if either the rod chamber or the end chamber has adjacent to it a volume of compressed gas, possibly separated from the fluid by a floating piston or a movable diaphragm. Furthermore, it is possible to have adjacent the end chamber or the rod chamber a separating piston which maintains a pretension in the liquid by means of a mechanical springing means.

The structural unit can be constructed with one or a plurality of cylinder-piston units. In the motor vehicles field, frequently two cylinder-piston units are used in conjunction with hinged members, one being provided at each of the two edges of the hinged member.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention is explained in greater detail hereinafter with reference to embodiments shown in the accompanying drawings, in which.

DETAILED DESCRIPTION OF THE PREFERRED EMBODIMENTS

Figure 1:
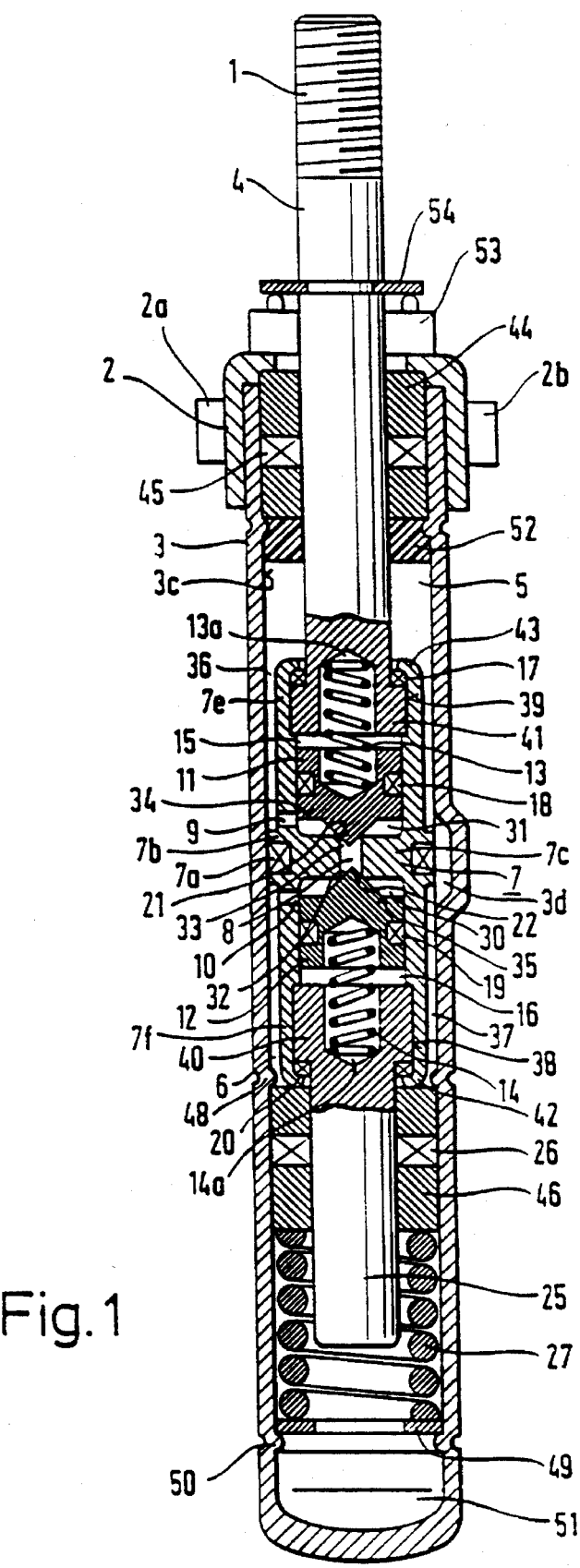
FIG. 1 shows a hydraulic blocking device with a double piston rod which at both ends of the separating piston is guided through respective end walls of the associated working chamber.

With regard to the embodiment shown in FIG. 1, the locking device is clamped between two fixing points 1, 2 the distance between which can be varied. The locking device consists of a cylinder 3 and a piston rod 4 which is adapted for movement relatively to it. In the cylinder 3, two working chambers 5, 6 are separated from each other by a separating piston 7. The separating piston 7 comprises connecting passages 8, 9, 10 which allow fluid to flow from the working chamber 5 into the working chamber 6. In the rest position, the working chambers are occluded by two throttle members 11, 12 by the force of two pretensioning springs 13, 14. The throttle member accommodating chambers 15, 16 are filled with air or gas at ambient pressure and are sealed in respect of the fluid filled working chambers 5, 6 by sealing elements 17, 18, 19, 20.

In the throttle member accommodating chambers 15, 16, the throttle members 11, 12 define through flow chambers 30, 31. The connecting passages 9, 10 each form a first through flow connection 9, 10 to the two through flow chambers 31, 30 while the connecting passage 8 forms a separate through flow connection 32, 33 respectively to the two through flow chambers 30, 31. The two second through flow connections 33 and 32, when at rest, are occluded by small pressure-actuating surfaces 21, 22 on the throttle members 11, 12. Inside the through flow chambers 31, 30, large pressure-exposed surfaces 34, 35 are constructed on the throttle members 11, 12. The through flow connections 9 and 10 represent a resistance to flow and open out into annular spaces 36, 37 on both sides of the separating piston 7. The separating piston 7 is provided with a separating piston gasket 7a which is disposed in the region of a thickened portion 7b of the separating piston and bears on an inner peripheral surface 3c of the cylinder 3.

Adjacent the throttle member accommodating chambers 15, 16 are extension chambers 38, 39 in which thickened portions 40, 41 of the piston rod 4 or of a piston rod extension 25 are housed and fixed. The throttle member accommodating chambers 15, 16 are closed in sealing-tight fashion by flanged-over portions 42, 43 and by the use of sealing elements 17 to 20. The piston rod 4 is guided in sealing-tight manner through one end 44 of the cylinder 3, a gasket 45 being incorporated, while the piston rod extension 25 is guided in sealing tight manner through a floating partition 46, a gasket 26 being employed. The floating partition 46 is restricted in its upwards movement by an indentation 48 in the cylinder 3 and is initially tensioned upwardly by a coil thrust spring 27, this latter being biased through a bracing disc 49 against a further indentation 50 of the cylinder 3. The space below the floating partition 46 is filled for instance with air at atmospheric pressure.

Braced against the end wall 44 is a rubber-elastic end support 52. The attachment point 2 is constituted by two journals 2a and 2b which may for instance be pivotally mounted on the body work of a motor vehicle. The attachment point 1 is constituted by a screw thread on the piston rod 4 which can for instance be supported on the door of a motor vehicle. It is also conceivable to mount the attachment point 2 at the bottom end of the cylinder 3 or at any desired location along the cylinder 3.

Fitted at the top end of the cylinder 3 is a switch 53 which co-operates with a switching element 54. The switching element 54 is fixed on the piston rod 4 and acts on the circuit of the switch 53. The circuit can for instance be the circuit for the interior lighting of a vehicle, so that this interior lighting is switched on when the door of the vehicle is opened and in consequence the piston rod 4 is extended upwardly out of the cylinder 3. When the piston rod is completely extended out of the cylinder 3, the flanged-over part 43 of the separating piston 7 strikes the rubber-elastic abutment 52 and so dampens the movement of the door before this latter has reached its extreme and farthest open position.

It can be seen that the separating piston 7 is formed by a one-piece separating piston member comprising an intermediate wall 7c and two extensions 7e and 7f. The coil thrust springs 13, 14 are accommodated by bores 13a and 14a in the piston rod 4 and piston rod extension 25. The coil thrust springs 13, 14 are, prior to fitment, substantially longer than shown in FIG. 1 and during assembly they are compressed to such an extent that they exert the particular desired pretensioning force on the throttle members 11 and 12.

The cylinder 3 is provided with a by-pass path 3d which is formed outwardly by an elongate bulge on the cylinder 3.

The locking device as it has been described so far works as follows: let it be assumed that the locking device is articulatingly connected to the body work of a motor vehicle at one end and to a door at the other, at locations 2 and 1 respectively. Let it be further assumed that the door is completely closed and that the condition of the locking device shown in FIG. 1 corresponds to the door when closed. If, now, the door is opened, then the gasket 7a of the separating piston 7 firstly moves in the region of the by-pass 3d so that the two working chambers 5 and 6 are initially still connected to each other and therefore the locking device is ineffective. If, then, during further progress of the movement to open the door the gasket 7a travels beyond the end of the by-pass 3d, then the two working chambers 5 and 6 are isolated from each other hydraulically at first and a hydraulic over-pressure builds up in the liquid enclosed in the working chamber 5. This hydraulic over-pressure in the working chamber 5 is applied to the through flow chamber 31 via the annular gap 36 and the first through flow connection 9. Therefore, it acts on the larger pressure actuated surface area 34 of the throttle member 11 against the action of the pretensioning spring 13. As soon as the over-pressure in the through flow chamber 31 exceeds a predetermined value, the throttle member 11 is, against the action of the pretensioning spring 13, lifted off the second through flow connection 33 which is formed by the connecting passage 8 in the intermediate wall 7c. This means that now the pressure inside the through flow chamber 31 also bears on the smaller working surface 22 of the lower throttle member 12, against the action of the lower pretensioning spring 14. The pressure which was sufficient to lift the upper throttle member 11 by acting on the larger working surface 34 is not sufficient also to lift the lower throttle member 12 off the through flow connection 32 of the associated through flow chamber 30. Instead, by reason of the force acting on the door and thus on the locking device according to FIG. 1, a further increase in pressure in the working chamber 5 is needed so that the throttle member 12 can be lifted off the associated through flow connection 32. The necessary increase in pressure depends thereby upon the size of the small pressure-exposed surface area 22 which is exposed to the pressure in the passage 8. As soon as the pressure in the passage 8 has risen sufficiently that the lower throttle member 12 lifts downwardly off the associated through flow connection 32, fluid is able to flow from the working chamber 5 through the through flow connection 9, the through flow chamber 31, the through flow connection 33, the passage 8, the through flow connection 32, the through flow chamber 30, the through flow connection 10 and the annular gap 37 to the second working chamber 6. When this happens, a drop in pressure occurs in the through flow connection 10. By reason of this pressure drop, an above-atmospheric pressure is obtained in the through flow chamber 30. This over-pressure acts on the larger pressure-exposed surface 35 of the throttle member 12 so that this throttle member is held in the open position in respect of the through flow connection 32, so long as there is a relative movement of the piston rod 4 in relation to the cylinder 3. Due to the action of the pressure on the large pressure-exposed surface 35 of the throttle member 12, a relatively small over-pressure in the through flow chamber 30 is sufficient to maintain the throttle member in the lifted-off position in respect of the through flow connection 32, so maintaining a through flow from the working chamber 6. In short, this has the following significance: once the throttle member 12 has been initially lifted off the through flow connection 32 by force acting on the door at a comparatively marked extent so that the through flow from the working chamber 5 to the working chamber 6 has been initiated, further movement of the door in the direction of the fully open position of the door requires comparatively little effort in order to maintain the throttle member 12 in the open position in comparison with the through flow connection 32, i.e. relatively minimal force is needed in order to move the door farther in the direction of the fully open position so long as the speed of movement is kept sufficiently great that the drop in pressure at the through flow connection 10 and the pressure in the through flow chamber 30 dependant upon this pressure drop is sufficient to maintain the throttle member 12 in the lifted-off position with respect to with the through flow connection 32.

Only if the speed of movement of the door and thus of the piston rod 4 in relation to the cylinder 3 becomes nil or so slow that the pressure in the through flow chamber 30 diminishes considerably does the throttle member 12 return to the position shown in FIG. 1. Then the door is arrested in any desired midway position which means it can only be set in motion again if a considerable pushing force is exerted on the door and thus on the piston rod 4, a pushing force which is great enough that, according to the direction of movement, one or other of the two throttle members 11, 12 is again lifted off the associated through flow connection 33, 32.

The completely symmetrical design of the piston 7 readily shows that the mode of operation described hereinabove to cover the opening of a door is also valid when the door is closed in which case, then, the over-pressure will naturally build up in the working chamber 6 first and initially cause the throttle member 12 to lift off the through flow connection 32 so that then, with a corresponding increase in the pushing force acting on the door, the throttle member 11 lifts off the through flow connection 33 and remains lifted off because once lift-off has occurred, the pressure prevailing in the through flow chamber 31 due to the drop in pressure at the through flow connection 9 acts on the larger pressure-exposed surface 34 of the throttle member 11.

FIG. 1 further shows that when the door again moves towards the closed position, the gasket 7a moves into the region of the by-pass 3d again. Then there is no longer a hydraulic force counteracting the further closing movement of the door. On the rest of the way until it is completely closed, the door can then be accelerated sufficiently by hand that its movement impulse which results is sufficient to cause the door to snap into the door lock against the resilient resistance which the door lock offers to prevent this snapping engagement.

Since the piston rod 4 and the piston rod extension 25 are of the same diameter, the total of the spaces in the two working chambers 5 and 6 does not change when there is a displacement of the piston rod 4 relative to the cylinder 3. Therefore, it is only necessary to take into account those fluctuations in the volumes of liquid contained in the two working chambers 5 and 6 which may arise due to temperature expansion or contraction of the fluid and/or such changes in these volumes of liquid which may occur due to leakage losses through the gaskets 45 and 26. To this end, the movable partition 46 is initially tensioned by a spring 27 in the direction of the indentation 48.

A strong coil thrust spring 27 is adjusted to such a spring force that under normal working conditions this spring is not substantially compressed when the piston rod 4 is retracted into the cylinder 3. For this purpose, care must be taken that when retracting the piston rod 4, the pressure in the through flow chamber 31 needed to lift the throttle member 11 off the through flow connection 33, in consequence of a pressure in the working chamber 6, is at a level which is not sufficient to displace the partition 46 against the action of the coil thrust spring 27.

It has been assumed hitherto that the pressure-exposed surfaces 21 and 22 are of the same area and that also the pressure-exposed surfaces 34 and 35 are identical to each other. This means that regardless of the direction of displacement of the piston 4 in relation to the cylinder 3 the pushing force needed to initiate the movement and also the resistance counteracting further movement are in each case the same. It can be readily appreciated that the small pressure-exposed surfaces 21 and 22 may differ from each other and that also the large pressure-actuated surfaces 34 and 35 can be made different from each other. Asymmetrical force relationships then arise and in some cases this may be desired.

Figure 2:
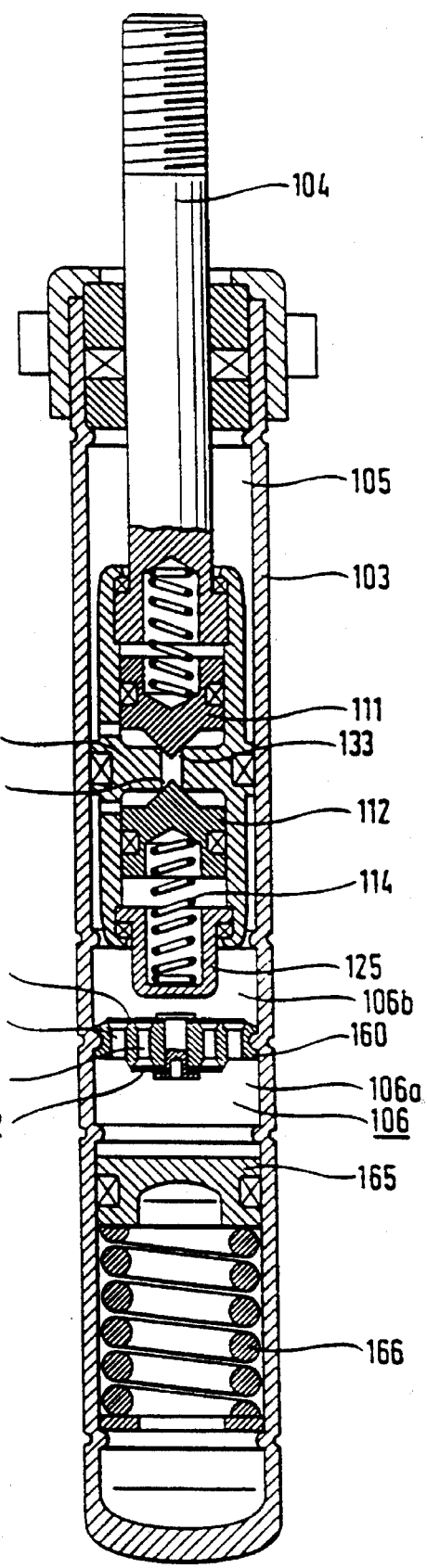
FIG. 2 shows a modified embodiment in which in order to compensate for the volume of the varying piston rod space a resiliently braced end wall is provided, a coil thrust spring being used to provide a resilient bracing arrangement.

The embodiment according to FIG. 2 differs from that shown in FIG. 1 in that the piston rod extension 25 according to FIG. 1 has been replaced by a plug 125 which just like the piston rod extension 25 in FIG. 1 is housed and sealed in the piston body and also accommodates as part of the pretensioning spring 114. As a working medium in the two working chambers 105 and 106 it is again possible to use a liquid. The working chamber 106 is sub-divided by a partition 160. This partition 160 comprises a first group of bores 161 with a closure spring 162. The closure spring 162 is a hard or a hard pretensioned closure spring. Furthermore, the partition 160 comprises a valve bore 163 with a soft or softly pretensioned closure spring 164. If the piston rod 104 is withdrawn from the cylinder 103, possibly as the result of the opening of a door, then the total volume in the working chambers 105 and 106 becomes greater. Under the action of a separating piston 165 and a coil thrust spring 166, fluid then flows out of the partial working chamber 106a into the partial working chamber 106b, only negligible resistance being offered to this secondary flow through the bore 163. The force to initiate movement of the piston rod 104 out of the cylinder 103 is substantially unchanged in relation to the embodiment shown in FIG. 1, subject to the valves being the same size. In particular, the force for initiating an outwards movement of the piston rod 104, in other words the force for stabilising the door, remains substantially unchanged.

On the other hand, if the piston rod is exposed to a downwardly directed force, possibly to prepare for closing of a door, then the pressure in the partial working chamber 106b initially rises. This pressure initially produces a lifting of the throttle member 112 off the through flow connection 132. Then, when the pressure in the partial working chamber 106b continues to rise, then also the throttle member 111 is lifted off the through flow connection 133. This lift off takes place before the strong valve spring 162 is lifted off the valve bore 161. This means that the force needed to lift the throttle member 112 off the through flow connection 132 is again the same as with the embodiment in FIG. 1 so that stabilising of the door is unchanged and is equally good in the direction of closure. If, now, the piston rod 104 is retracted into the cylinder 3, then the closing force of the valve spring 162 must be overcome since the piston rod 104 increasingly displaces volume inside the cylinder. Furthermore, the end wall 165 must be displaced downwardly against the action of the coil thrust spring 166. Due to the need to open the valve spring 162 and push the end wall 165 downwardly, there is an additional resistance to the piston rod 104 being pushed in. However, since this piston rod 104 is now of comparatively small cross-section compared with the total cross-section of the separating piston 107, the volume displacement by the valve 161, 162 per unit of length of displacement of the piston rod 104 is relatively slight and in the same way the displacement path of the end wall 165 per unit of length of the displacement of the piston rod 104 is comparatively slight. The additional resistance to movement can consequently be so reduced by minimal cross-sectional dimensioning of the piston rod 104 that it produces only an inconsiderable change in the mode of action of the locking device according to FIG. 2 in comparison with that according to FIG. 1.

Figure 3:
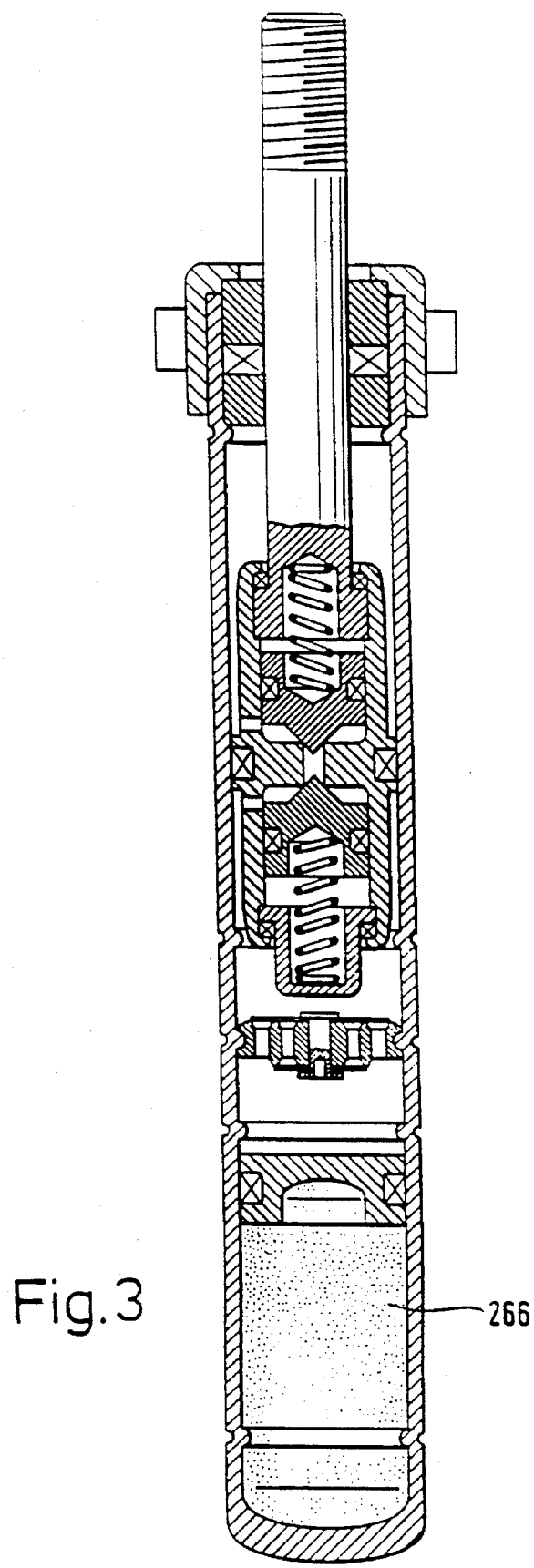
FIG. 3 shows a further modified embodiment which corresponds substantially to that shown in FIG. 2 but with the coil thrust spring replaced by a space containing compressed gas.

The embodiment shown in FIG. 3 differs from that in FIG. 2 only in that the coil thrust spring 166 has been replaced by a pressurized gas volume 266. The advantage of this embodiment resides in the fact that the spring force of the pressurized gas volume can easily be changed by appropriate filling.

Figure 4:
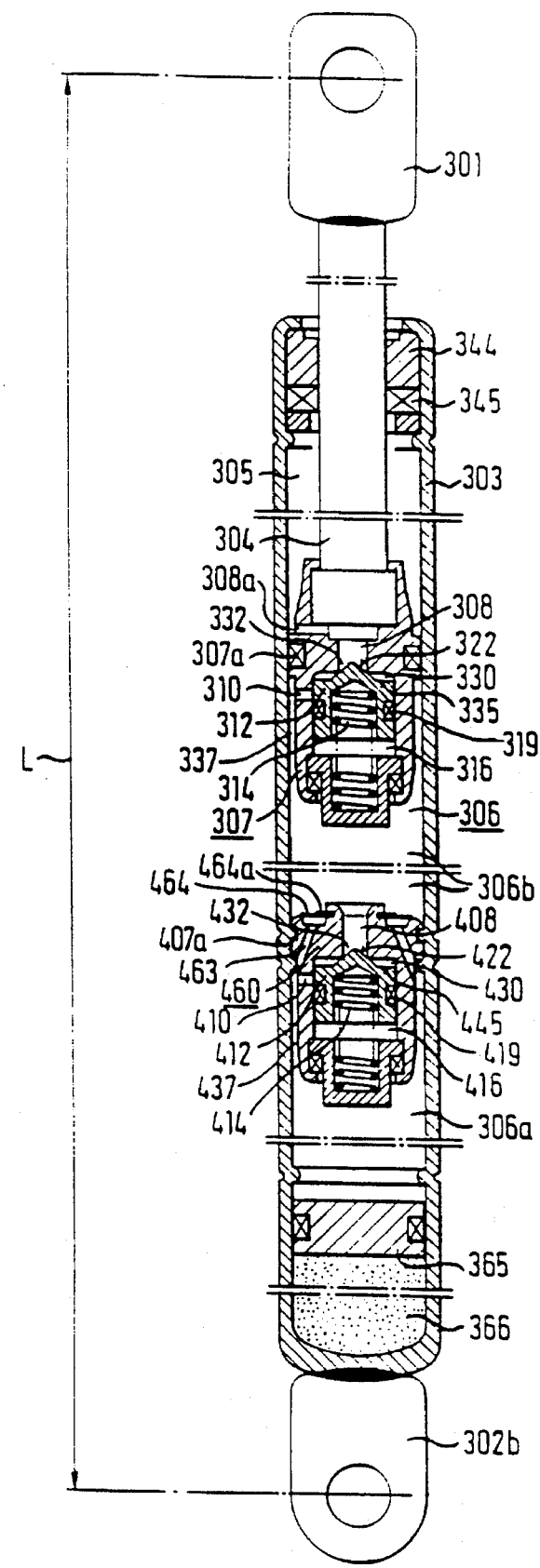
FIG. 4 shows a further embodiment of a hydraulic locking device in which the separating piston is simplified and a bottom valve unit is provided.

FIG. 4 shows a further embodiment, parts which are identical being provided with the same reference numerals as in FIGS. 1, 2 and 3 but increased by 300 and 200 or 100 respectively.

Inserted into the cylinder 303 from the top end, through the end wall 333 and the gasket 345 is a slideable piston rod 304 which carries at its top end a hinge lug 301. Constructed inside the cylinder 303 are the two working chambers 305 and 306 which together form a cylindrically tubular cavity 305, 306. The lower working chamber 306 is divided by the partition 460 into two partial working chambers 306a and 306b. The working chamber 305 is separated from the upper partial working chamber 306b by the separating piston unit 307. The separating piston unit 307 is constructed in the same way as the bottom half of the separating piston unit 7 in FIG. 1. The working chamber 305, the two partial working chambers 306b and 306a are filled with liquid. The floating partition 365 separates the lower partial working chamber 306a from a space 366 filled with pressurized gas.

Accommodated in the separating piston unit 307 is a sealing piston 312 which corresponds to the throttle member 12 in FIG. 1. This sealing piston 312 is sealed in respect of the inner peripheral surface of a space 316 by a gasket 319. Defined above the sealing piston 312 is a through flow chamber 330. This through flow chamber 330 comprises a first connection 332 corresponding to the through flow connection 32 in FIG. 1. Via an axial bore 308 and a radial bore 308a, this first connection 332 is substantially adjacent the upper working chamber 305 with no throttle in between. A second connection 310 corresponds to the through flow connection 10 in FIG. 1 and connects the through flow chamber 330 to the partial working chamber 306b. It must be ensured that in any position of the sealing piston 312, the second connection 310 is disposed inside the space 316 above the gasket 319 so that the through flow chamber 330 is constantly in communication with the partial working chamber 306b, the cross-section of the second connection 310 being narrow and forming a throttle point the significance of which will be dealt with later.

In the position shown in FIG. 4, the sealing piston 312 is applied by the coil thrust spring 314 against the first connection 332 in a sealing-tight manner so that the through flow chamber 330 is separated from the upper working chamber 305. Furthermore, it is important to ensure that in the situation shown in FIG. 4 the fluid filling of the upper working chamber 305 bears via the bores 308 and 308a on a small fluid-exposed cross-section 322 of the sealing piston 312 and that a larger fluid-exposed cross-section 335 is exposed to the pressure inside the through flow chamber 330. The partition 460 in its basic effect corresponds to the partition 160 in FIG. 2 but, in contrast to the embodiment of partition 160 in FIG. 2, it is constructed in a manner similar to that of the separating piston unit 307. The partition 460 is axially fixed in the cylinder by deformation of the cylinder 303 in respect of which it is sealed.

Identical parts of the partition 460 are identified by the same reference numerals as the corresponding parts of the separating piston unit 307 but furthermore raised by 100.

Furthermore, a non-return valve which opens from the partial working chamber 306a into the partial working chamber 306b is constructed on the partition 460. Forming part of this non-return valve are bores 463. These bores are masked by a valve plate 464 which is in turn overlaid by a plate spring 464a so that the valve plate 464 is maintained in the closed position with a small amount of pretension.

The mode of operation then is as follows: in FIG. 4, the piston rod 304 is locked in respect of the cylinder 303. If the total length of the cylinder piston unit 303, 304 is to be extended, then a traction force must be applied to the hinge lug 301 and the hinge lug 302b. Then the pressure in the upper working chamber 305 increases. This increased pressure is now applied to the small fluid-exposed cross-section 322 via the bores 308 and 308a. By virtue of the small size of the fluid-exposed cross-section 322, a relatively considerable increase in pressure in the working chamber 305, i.e. a relatively great tractive force on the hinge lug 301, is required in order to cause the sealing piston 312 to be lifted off the first connection 332. The design and pretension of the coil thrust spring 314 determines the pressure which has to be built up in the working chamber 305 by traction exerted on the hinge lug 301 in order to cause the sealing piston 312 to be lifted off the first connection 332. Therefore, it is necessary to apply a relatively considerable "break-free force" to the hinge lug 301 in order to initiate an extraction movement of the piston rod 304. Once the sealing piston 312 has lifted off the first connection 332, then there is a flow of fluid from the working chamber 305 through the bores 308a and 308, the first connection 332, the through flow chamber 330, the second connection 310 and the annular channel 337 in the direction of the upper partial working chamber 306b. Attention has already been drawn to the fact that the bore constituting the second connection 310 is constructed as a throttle. If, now, fluid flows from the upper working chamber 305 to the upper partial working chamber 306b, then there is a pressure drop at the throttling bore 310. Then, an intermediate pressure is established in the through flow chamber 330 which is indeed less than the pressure built up in the upper working chamber 305 by the tractive effect, but it is still considerably greater than the pressure in the partial working chamber 306b and great enough to overcome the force of the spring 314 and any pressure in the chamber 316. This intermediate pressure in the through flow chamber 330 now acts on the large fluid-exposed cross-section 335 of the sealing piston 312. Therefore, all in all there is now increased pressure on the entire upper surface of the sealing piston 312 constituted by the sum of the small fluid-exposed cross-section 322 and the large fluid-exposed cross-section 335. Thus, the sealing piston 312 is now maintained in a position in which it is lifted off the first connection 332, even if the fluid pressure in the upper working chamber 305 should fall again. This means that—once the first connection 332 has been opened once—a relatively minimal pull on the hinge lug 301 is sufficient to withdraw the piston rod 304 and so further increase the total length L. Applied to the case of a motor vehicle door, once again this means that after a pushing force which is sufficient to lift the sealing piston 312 off the first connection 332, a relatively small amount of effort is needed in order to open the door farther (subject to an opening of the door corresponding to an increasing of the length L while closing the door corresponds to a shortening of the length L). Therefore, after briefly exerting an opening pushing force on the motor vehicle door, this can be opened farther with minimum effort. cross-section When one is approaching a desired new open position of the door, the opening movement of the door which is performed manually can be slowed down to zero speed. Accordingly, the rate of liquid flow out of the working chamber 305 into the partial working chamber 306b diminishes. Then also the pressure drop in the second connection 310 abates and the pressure in the through flow chamber 330 approximates more and more the pressure in the partial working chamber 306b. In the case of an intermediate pressure determined by construction and pretension of the coil thrust spring 314 and by the dimensioning of the small fluid-exposed cross-section 322 and the large fluid-exposed cross-section 335, this intermediate pressure is no longer sufficient to maintain the sealing piston lifted off the first connection 332 which is then closed again. The piston rod 304 is thus arrested again in the direction of being pushed out in respect of the cylinder 303, until once again a pushing force is applied in order to open the door farther if required.

If in the case of the aforedescribed pull-out movement of the piston rod 304 in respect of the cylinder 303 the piston rod length remaining inside the cylinder 303 becomes shorter, then there is an increase in the space composed of the sum of the working chamber 305 and upper partial working chamber 306b. Therefore, in the absence of additional measures in the two chambers 305 and 306b, the liquid contained prior to commencement of the movement of pulling out the piston rod 304 would no longer be sufficient completely to fill the two chambers, working chamber 305 and partial working chamber 306b. Then, the piston rod would have play in its movement. This is prevented by the aforedescribed construction of the partition 460. If, namely, there is an increase in volume in the upper partial working chamber 306b due to extension of the piston rod 304, then also the pressure prevailing in the partial working chamber 306b is reduced. Then the pressure prevailing in the lower partial working chamber 306a can easily open the non-return valve 464 in keeping with its slight pretension and liquid is able to flow from the lower partial working chamber 306a into the upper partial working chamber 306b, the floating wall 365 moving upwardly under the pressure of the gas volume 366.

It has been pointed out hereinabove that the piston rod 304 can be set in motion from being stationary but only with the application of a relatively considerable pushing force. This is desirable because, for instance in the case of a motor vehicle door, this door cannot be regularly opened by wind force or by an unintended push from the driver. It will be demonstrated hereinafter that also an unintentional shortening of the total length L cannot easily be effected by pushing in the piston rod 304. When the piston rod 304 is pushed into the cylinder 303, the non-return valve 464 is acted upon in the direction of closure by the pressure prevailing in the working chamber 306b and it does not allow any fluid to pass from the partial working chamber 306b into the partial working chamber 306a. Pushing in the piston rod 304, then, initially leads to an increase in the pressure in the upper partial working chamber 306b. At the onset of pushing in, the upper partial working chamber 306b is separated from the upper working chamber 305 because, in keeping with its inoperative state, the sealing piston 312 bears in sealing-tight manner on the first connection 332 so that no liquid is able to pass from 306b to 305. Increasing the pressure in the partial working chamber 306b, however, means that the larger fluid-exposed cross-section 335 is acted upon by liquid via the bore 310. Therefore, a relatively minimal pressure is sufficient to open the first connection 332 and initiate a transfer of liquid from the upper partial working chamber 306b into the upper working chamber 305. This means that theoretically only a minimal resistance to push-in counteracts pushing of the piston rod 304 into the cylinder 303. However, pushing the piston rod 304 in entails an increase in the volume displaced by the piston rod 304 inside the cylinder 303. In order to be able to compensate for this reduction in volume in the two working chambers 305 and 306b together, fluid has to be moved from the upper working chamber 306b into the lower partial working chamber 306a. Since the non-return valve 464 is not available for this, all that remains is the way via the first connection 432, the through flow chamber 430, the second connection 410 and the annular passage 437. However, in order to make this way available, it is necessary first to lift the sealing piston 412 off the first connection 432 and for this purpose, on account of the small size of the fluid-exposed- cross-section 422 with corresponding design and initial tension of the coil thrust spring 414, a relatively high pressure is required in the upper partial working chamber 306b. Therefore, when pushing in of the piston rod 304 into the partial working chamber 306b starts, a relatively high pressure has to be generated so that the sealing piston 412 lifts off the first connection 432. Once this lifting off process is completed, there is a flow of liquid from the partial working chamber 306b into the partial working chamber 306a corresponding to the increasing immersion of the piston rod 304 into the cylinder 303. Once again, there builds up in the through flow chamber 430 an intermediate pressure which acts to lift the sealing piston 412 off the first connection 432 so that subsequently the sealing piston 412 can also be maintained open with a reduced pressure in the partial working chamber 306b. This means that once the piston rod has been set in motion, it can be pushed farther in with a relatively minimal application of pressure to the hinged lug 301. This pushing in movement counteracts the through flow resistance through the bore 310 and the first connection 332. However, this through flow resistance is relatively minimal because of course the sealing piston 312 is, in this stage of the operation, again being acted upon at the large fluid-exposed cross-section 335. Furthermore, the pushing in movement counteracts the through flow resistance from the partial working chamber 306b to the partial working chamber 306a. But even this through flow resistance can be minimized because once the movement to push in the piston rod 304 has been initiated, the pressure which builds up in the partial working chamber 306b acts on the large fluid-exposed cross-section 445 of the sealing piston 412. Finally, pushing of the piston rod 304 into the cylinder 303 is also counteracted by the gas volume 366 which has to be compressed upon the flow of liquid into the lower working chamber 306a with a downwards movement of the floating partition 365. This compression force is however relatively small and this is a particular advantage of the aforedescribed design: were the partition 460 not present and if it were necessary to build up a high degree of pressure in the upper working chamber 306b in order to open the first connection 432, then it would only be possible to provide an adequate push-in resistance which is necessary for instance to prevent the unintentional closure of a motor vehicle door, by imposing a correspondingly high pressure on the gas volume 366. This high pressure would however mean that when it was intended to close the motor vehicle door over its entire closure path, it would be necessary to apply a considerable force to the door by hand. This is not intended. It is far more the wish of the motor vehicle proprietor to be able easily to move the door, also in the direction of closure, after the brief application of a pushing force and as described hereinabove, this is achieved by the embodiment according to FIG. 4. The low pressure of the gas volume 366 also has the advantage that pushing out the piston rod 304 is not substantially assisted by the piston-cylinder unit. In many cases, particularly in the case of a vertical pivoting axis of a motor vehicle door, such assistance is not desired since it might lead to the door opening rapidly. However, it is not intended either to exclude the possibility of the gas pressure being used to assist door opening, possibly when the pivot axis of the motor vehicle door is in a corresponding inclined attitude and a closing moment is generated in a direction of closure by the actual weight of the door. It is possible to compensate for such a closing moment by appropriate dimensioning of the gas pressure in the gas volume 366.

It must also be pointed out that the gas volume 366 which acts on the floating partition 365 can also be replaced by a coil thrust spring. It must also be pointed out that the compensating volume for the variable displacement volume of the piston rod which is provided at the bottom end of the cylinder 303 by the floating partition 365 in FIG. 4 can also be formed at the upper end of the cylinder 303, possibly in that a volume of gas is incorporated beneath the gasket 345. It must be anticipated that the piston-cylinder unit can also be used horizontally or upside down. Therefore, it is recommended to provide an annular floating partition which then separates the volume of gas at the top end of the cylinder 303 from the liquid in the working chamber 305. In this case, too, the volume of gas could once again be replaced by a coil thrust spring.

Figure 5:
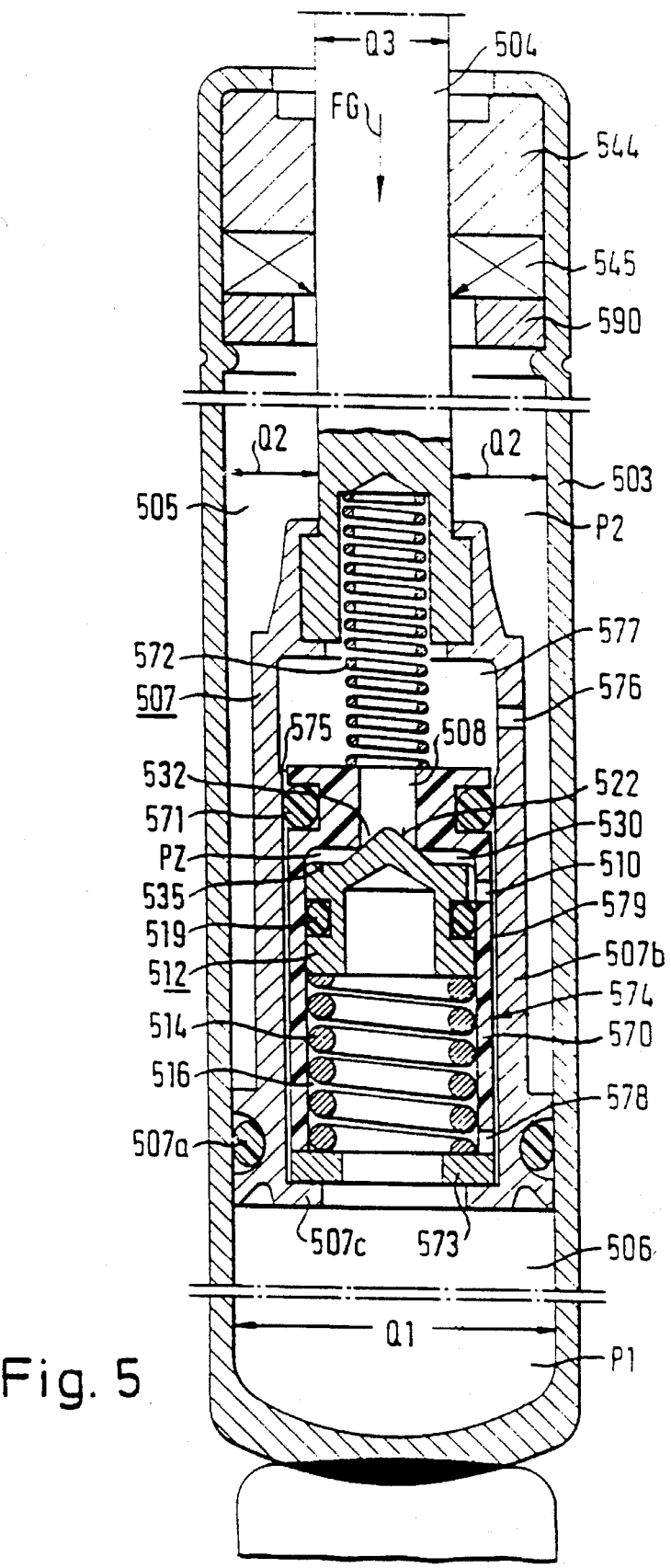
FIG. 5 shows a further embodiment intended particularly for use on vertically adjustable hinged members of motor vehicle.

FIG. 5 shows a gas spring which substantially corresponds to the principles of design shown in FIGS. 1 to 4. Identical parts are identified by the same reference numerals as in the preceding drawings, but in each case they have an initial digit of 5.

In this embodiment, once again the separating piston unit 507 with a hollow piston member is rigidly mounted on the piston rod 504 and, via the gasket 507a, it separates the two working chambers 505 and 506 from each other. The hollow piston member is designated 507b and is rigidly fixed to the piston rod. Accommodated in displaceable fashion in the hollow piston member 507b is a sleeve member 570 which, in the space 316, accommodates the sealing piston 512 which is constructed in exactly the same way as in the previously described embodiments and it is accordingly designated 512. The sleeve member 570 forms below a gasket 571 an annular gap 579 with the inner peripheral surface of the hollow piston member 507b. The through flow chamber 530 with the first connection 532, the second connection 510, the gasket 519, the large fluid-exposed cross-section 535, the small fluid-exposed cross-section 522 and the bore 508 is constructed in exactly the same way as the corresponding parts in the preceding drawings, which is expressed by conformity of the last two digits in the respective reference numerals. In contrast to the preceding embodiments, the side of the sealing piston 512 which is remote from the first connection 532 is exposed to the pressure in the lower working chamber 506 plus the spring force of the coil thrust spring 514.

The sleeve member 570 on the one hand assumes the function of a fluid guide member and on the other the function of a non-return valve member. It is pretensioned into the position shown in FIG. 5 by a coil thrust spring 572 which maintains the sleeve member 570 bearing against a bracing shoulder 507c, through an annular disc 573 against which the coil thrust spring 514 is biased, said annular disc 573 being possibly fastened to said sleeve member 570. The non-return valve to which the sleeve member 570 belongs is generally designated 574. This non-return valve 574 includes a step 575 on the inner peripheral surface of the hollow piston member 507b and a radial bore 576 which connects a non-return valve chamber 577 to the upper working chamber 505. This embodiment which is shown in FIG. 5 behaves in a very similar manner to the previously described embodiment shown in FIG. 4. When the piston rod 504 is pulled upwardly out of the cylinder 503, an increased pressure builds up in the upper working chamber 505. This increased pressure acts through the bore 576 and the bore 508 on the small fluid-exposed cross-section 522 of the sealing piston 512.

Upon commencement of the outwards movement of the piston rod 504, there is once again need for a relatively high pressure in the working chamber 505 and thus in the bore 508 so that despite the small fluid-exposed cross-section 522 the sealing piston 512 lifts off the first connection 532 of the through flow chamber 530. Once this lifting off process has taken place, the increased pressure inside the upper working chamber 505 which is created by the pull out force applied to the piston rod 504 also acts on the larger fluid-exposed cross-section 535 of the sealing piston 512 as a result of the pressure drop in the second connection 510, so that upon continued outwards movement of the piston rod 504, the sealing piston 512 also remains lifted off the first connection 532 if the pressure in the upper working chamber 505 becomes reduced again. Therefore, as with all the preceding embodiments, there is also here an element in which, in order to initiate a movement of the piston rod, a relatively considerable pushing force is needed and afterwards the pull out movement can be continued with just a minimal pull out force. When the speed at which the piston rod 504 is being pulled out in relation to the cylinder 503 comes close to ZERO, then the pressure on the larger fluid-operated cross-section 535 becomes so small that it can no longer maintain balance between the pressure of the coil thrust spring 514 and the pressure of the gas volume in the lower working chamber 506. Consequently, the first connection 532 closes again and movement of the piston rod 504 comes to a standstill.

Upon an inwards displacement of the piston rod 504 in respect of the cylinder 503, the non-return valve 574 opens. A relatively minor increase in pressure in the lower working chamber 506 is sufficient to move the sleeve member 570 upwardly. The increased pressure in the working chamber 506 namely acts on the back of the sealing piston 512; this is moved upwardly with respect to the separating piston unit 507 and, with continued closure of the first connection 532, entrains the sleeve member 570 upwardly until such time as the gasket 571 has slipped over the step 575. Then gas is able to flow out of the lower working chamber 506 through a notch 578, the annular space 579, the chamber 577 and the bore 576 and into the upper working chamber 505.

Figure 7:
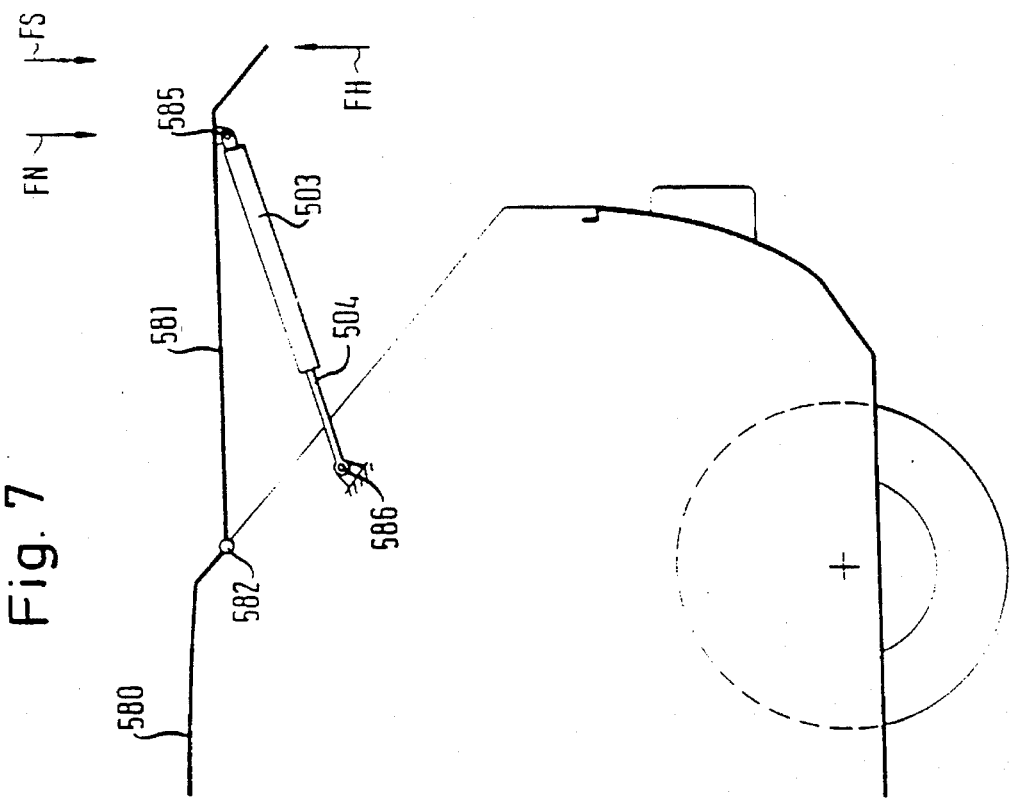
FIG. 7 shows a motor vehicle according to FIG. 6 with the hinged member in a midway position.
Figure 6:
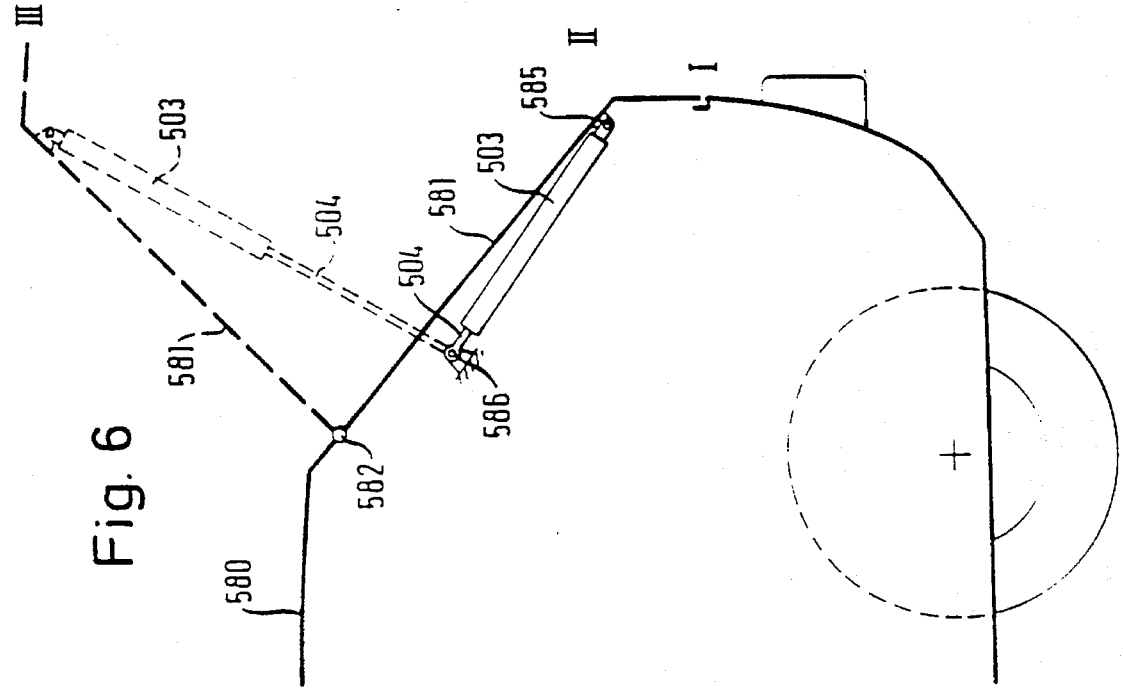
FIG. 6 shows a motor vehicle with a tail gate in the closed position, a locking device according to FIG. 5 being used, the hinged member being shown in solid lines to illustrate the closed position and in broken lines to show the open position.

The particular feature arising from the gas filling and a push out force exerted on the piston rod 504 by this gas filling can be most easily explained with regard to an arrangement such as is shown in FIGS. 6 and 7. These drawings show a motor vehicle body 580 and a tailgate 581 is articulated on the body 580 at 582. FIG. 6 shows the closed position of the tailgate 581 in solid lines while the broken lines indicate the fully opened position. FIG. 7 shows the tailgate in an intermediate position. A cylinder-piston unit 503, 504 of the type shown in FIG. 5 is articulated on the tailgate 581 at 585 and on the body work 580 at 586. Two such piston-cylinder units may be disposed parallel, for instance one on each of the two longitudinal boundary walls of the body work. For purposes of the ensuing description of operation, it is assumed that a single piston-cylinder unit is provided. If there are two such piston-cylinder units, the situation changes only in that in such a case each of these piston-cylinder units only has to apply half the lift assistance and arresting forces.

Firstly, FIG. 7 will be examined in conjunction with FIG. 5 and initially it is sufficient to establish that the push out force exerted on the piston rod 504 by the pressure of gas inside the cylinder 503 is basically capable of further raising the tailgate 581 from the position shown in FIG. 7 without any manual aid. When examining FIG. 5, it is further assumed that the piston rod 504 is stationary. The first connection 532 is closed, the non-return valve 574 is likewise closed. There is no connection between the two volumes of gas in the working chambers 505 and 506. The tailgate 581 which is adapted to pivot about the hinge axis 582 suffers, by reason of its own weight, a turning moment about the hinge axis 582 and this seeks to close the tailgate 581 and exerts on the piston-cylinder unit 503, 504 a force which seeks to push the piston rod 504 into the cylinder 503.

According to FIG. 5, in a position corresponding to FIG. 7, there is in the lower working chamber, also referred to as the end chamber, a pressure P1 while there is a pressure P2 in the upper working chamber 505, also referred to as the rod chamber. The pressure P1 acts on the full cross-section of the separating piston unit 507 which is designated Q1. The pressure P2 acts on an annular cross-section Q2 which constitutes the difference between the cross-section Q1 and the cross-section Q3 of the piston rod 504. Furthermore, there acts on the piston rod 504 a weight force FG determined by the weight of the tailgate 581 and the position of the articulation points 582, 585 and 586. In the state of equilibrium, the following equation is virtually applicable: $P1 \times Q1 = P2 \times Q2 + FG$. In this case, in the state of equilibrium, the pressure P2 is greater than the pressure P1. The pressures P2 and P1 both of which engage the sealing piston 512 are thereby, also taking into account the coil thrust spring 514, so adjusted that the sealing piston 512 does not lift off the first connection 532. For the rest, the pressures P1, P2 are so adjusted that, taking into account the springs 514 and 572, the sleeve member 570 retains its position assumed in FIG. 5 and the non-return valve 574 is therefore closed.

Let it further be assumed that the user of the motor vehicle wishes further to open the tailgate 581 in relation to the position shown in FIG. 7, in the direction of complete opening as indicated by the broken lines in FIG. 6. To do this, the user applies a lifting force FH by hand to the tailgate 581. This lifting force produces a force which seeks to pull out the piston rod 504. This pull-out force alters the equilibrium so that the pressure P2 in the working chamber 505 increases. This increase in pressure in the upper working chamber 505 means that there is also a rise in pressure on the small fluid-exposed cross-section 522. As a result of this rise in pressure, the sealing piston 512 is lifted off the first connection 532. In order to make it possible also for weak users of the vehicle to lift the sealing piston 512 off the first connection 532, a corresponding disposition and design of the piston-cylinder unit which is constructed as a gas spring ensure that even at a lifting force FH of less than 100N and preferably at a lifting force FH of less than 50N, the increase in gas pressure P2 in the upper working chamber 505 is sufficient to cause the sealing piston 512 to be lifted off the first connection 532. If, now, the sealing piston 512 is lifted off the first connection 532, then there is a flow of gas from the upper working chamber 505 to the lower working chamber 506 following the route 576, 577, 508, 530, 510, 579, 578. The direction of flow, as already mentioned above, arises from the fact that the pressure P2 in a state of equilibrium is greater than the pressure P1. In the case of this flow from the working chamber 505 to the working chamber 506, as already explained in detail in the aforedescribed embodiments, there is a pressure drop at the second connection 510. The effect of this pressure drop is that an intermediate pressure PZ is established in the through flow chamber and is greater than the pressure P1. This intermediate pressure PZ acts then on the larger fluid-exposed cross-section 535 and ensures that the sealing piston 512 remains lifted off the first connection 532 even if the increase in pressure P2 in the upper working chamber 505 brought about temporarily by the application of the lifting force FH is cancelled again.

Once the sealing piston has been lifted off the first connection 532 and is maintained open by virtue of the action of the intermediate pressure PZ, then the piston rod 504 can be pushed automatically out of the cylinder 503, lifting the tailgate 581. It is only necessary to ensure that the push-out force exerted on the cross-section Q1 by the pressure P1 is greater than the sum of the force exerted by the pressure P2 on the cross-section Q2, the weight force FG and the resulting resistance to through flow from the working chamber 505 to the working chamber 506. Certainly, it is important to remember that the push-out movement of the piston rod 504 occurs at the speed which is sufficient to maintain the intermediate pressure PZ at the larger fluid-operated cross-section 535 above the level needed to maintain the sealing piston 512 lifted off the first connection 532. The dimensions in the gas spring 504, 503 needed to satisfy these conditions can easily be arithmetically and/or experimentally ascertained by a man skilled in the art, in the light of the tailgate weight and the articulation points 582, 585, 586. Once these conditions have been satisfied, therefore, when one wishes to raise the tailgate 581 in relation to the inoperative position shown in FIG. 7, it is necessary only to exert a brief and relatively minor lifting force FH on the tailgate and then the tailgate will rise by itself until it is again arrested or until the tailgate 581 has reached the position of maximum opening shown in FIG. 6, which is determined by abutments between body work and tailgate or by an abutment of the separating piston unit 597 against the abutment ring 590. If it is desired to arrest the upwards movement of the tailgate 581 before it has reached the highest position shown in FIG. 6, this can be achieved by briefly and manually applying a depressing force to the tailgate as shown in FIG. 7. The following then happens: the speed of extension of the piston rod 504 is reduced and consequently the intermediate pressure PZ in the through flow chamber 530 drops and is no longer sufficient to keep the sealing piston 512 lifted off the first connection 532. In this way, the sealing piston 512 occludes the first connection 532; the working chambers 505, 506 are again isolated from each other; the piston rod 504 remains stationary in relation to the cylinder 503; the tailgate 581 has reached a fresh midway position. This new intermediate position is subject to the same considerations raised hereinabove for the intermediate position shown in FIG. 7.

At this point, it should be noted that by corresponding calculation or experimentation, it is again possible to choose such a dimensioning of the piston-cylinder unit and of its installation conditions that only a relatively minor depressing force FN is needed to arrest the upwards movement of the tailgate.

Preferably, care will be taken to ensure that this depressing force FN is less than 100N and preferably less than 50N. Once this depressing force FN has been briefly applied, the tailgate remains in the position reached and is at rest, as shown in FIG. 7, even when the depressing force FN is removed from the tailgate 581. With regard to the magnitude of the raising force FH and the depressing force FN, only the upper limit values have been indicated hereinabove, in consideration of the fact that also a weak person is able to apply these forces. Nevertheless, it should be mentioned that these forces FN and FH ought not to be reduced willy nilly. They ought to be sufficiently great that accidental pushing of the tailgate or wind forces cannot give rise to unintended movements.

On a basis of the situation shown in FIG. 7, if it is desired to lower the tailgate in the direction of closure, as indicated by solid lines in FIG. 6, then it is necessary to apply a lowering force FS to the tailgate as shown in FIG. 7. Then the pressure P1 in the working chamber 506 increases and this increased pressure acts on the sealing piston 512 and the sleeve member 570. As a result of this increased pressure, the sleeve member 570 together with the sealing piston 512 is displaced upwardly in FIG. 5 until the sealing ring 571 has passed beyond the stop 575 on the inside face of the space 577. A through flow facility from the working chamber 505 is then opened up via 578, 579, 577, 576 toward the working chamber 505. In this situation the lowering force FS must be continued over the entire intended lower path.

However, it is also possible arithmetically or experimentally to achieve such a dimensioning of the gas spring in the light of the tailgate weight and the disposition of the articulation points 582, 585, 586 that also the lowering force FS needed to lower the tailgate takes into account the needs of a weak person and is in particular no greater than 100N and preferably no greater than 50N.

It can readily be seen from FIG. 7 that during the course of a movement which pivots the tailgate 581, the situation is constantly changing. These changes must naturally be taken into account also when dimensioning the gas spring so that the aforedescribed conditions and processes are virtually applicable at all points along the pivoting path. When the tailgate comes close to the closed position shown in solid lines in FIG. 6, it is often not required that the tailgate should then be maintained in a midway position by the gas spring nor is it then any longer necessary for raising of the tailgate to be assisted by the gas spring. In a short portion of the pivoting range prior to the closure position, midway positions are in fact unnecessary because in practice such intermediate positions are hardly ever needed. In this borderline area adjacent the closed position, assistance of tailgate raising is not even desirable because having regard to the conventional lock structures it is necessary when approaching the position of closure to accelerate the tailgate movement in order to ensure that the lock engages with a snap action. The aforedescribed effect of automatic closure can be limited to a range of movement which in FIG. 7 extends substantially from point I to point II, according to the position of closure. Within this range of movement I, II, then, one then has to apply a force to open the tailgate and no intermediate positions can be established. Thus, on the one hand, consideration is given to the individual needs of persons of small stature and on the other hand, the tailgate 581 can, in the range of movement from II to III, be adjusted to whatever angle of opening happens to be needed for loading or unloading relatively small or large objects. Furthermore, the tailgate can be arrested in whatever position is still acceptable for movement under obstacles, e.g. when driving through garage doors.

At this point, it should also be noted that in some cases it is possible to dispense with the non-return valve 574 shown in FIG. 5 because basically the sealing piston 512 itself can serve as a non-return valve. It should be recalled that the pressure P1 in the working chamber 506 acts on the larger fluid- exposed cross-section 535 so that when the piston rod 504 is pushed in by a lowering force FS, the opening from the working chamber 506 to the working chamber 505 can also be brought about in that the sealing piston 512, as a result of the pressure P1 acting on the large fluid-exposed cross-section 535, is lifted off the first connection 532 so that there is a through flow path 578m 579, 510, 530, 508, 576. However, where calculation and design are concerned, the development shown in FIG. 5 affords a wider range of freedom which can be utilised to achieve optimum convenience for the operator.

In conclusion, it should be mentioned that the separating piston unit 507 can in principle also be used in a positioning device, possibly according to FIG. 4, in place of the separating piston unit 307 which is shown therein and that also, conversely, the separating piston unit 307 shown in FIG. 4 can be used in the embodiment shown in FIG. 5 in place of the separating piston unit 507. Furthermore, it should be mentioned that the embodiment according to FIG. 5 is not necessarily tied to having only pressurized gas in the two working chambers 505 and 506. Instead, the embodiment according to FIG. 5 could also be modified to have the upper working chamber 505 filled with liquid and the lower working chamber 506 divided into a liquid-filled and a gas-filled space as shown in FIG. 4.

With regard to FIG. 5, it should be added that with a corresponding dimensioning of the springs 514 and 572, the bracing disc 573 can also be axially immovably fixed on the sleeve member 570.

With reference to FIGS. 5 to 7, an embodiment has been explained in which the tailgate is raised automatically by the cylinder-piston unit or units as soon as a lifting force FH has been briefly applied.

Basically, it is also conceivable for a cylinder-piston unit 503, 504 to be used in order to facilitate raising of the tailgate but so to dimension the gas pressure in the cylinder-piston unit 503, 504 that the cylinder-piston unit or units only provide assistance during lifting. Nevertheless, it is possible in such a case to have an arresting facility. In this instance, the directions of through flow of the non-return valve 574 on the one hand and the through flow direction through the first connection 532 on the other can be interchanged while retaining the relationship between cylindrical tube 503 and piston rod 504 as shown in FIG. 5 in that the entire separating piston unit 507 in FIG. 5 is turned upside down so that its end which is at the bottom in FIG. 5 is applied against the piston rod 504. Then, too, a state of equilibrium is assumed when the tailgate occupies the position shown in FIG. 7. If, then, it is desired to move from the position according to FIG. 7 into a further raised position of the tailgate, then it is necessary to apply a lifting force FH over the entire lifting path, whereby the pressure relief valve 574 opens. On the other hand, starting from the position shown in FIG. 7, if it is desired to move the tailgate 581 to a lower position, then a lowering force FS must be applied in order firstly to lift the sealing piston 512 off the first connection 532. Once this opening has been achieved, the sealing piston 512 remains lifted off the first connection 532 and the tailgate will automatically lower.

Even with such a solution, the forces to be applied by hand can be so dimensioned that they are within the capacity of a small person.

It is further to be noted that the device as shown in FIG. 5 can also be used in a construction as shown in FIGS. 6 and 7, when the gas filling of the cylinder 503 is not sufficient to overcome the gravity of the tailgate 581 even after the sealing piston 512 has been lifted from the first connection 532. In this case, a lifting force by hand must be maintained during the total desired lifting operation of the tailgate 581. The lifting force is, however, reduced again after the sealing piston 512 has once been lifted from the first connection 532. This solution would therefore offer the advantage that when starting an upward movement of the tailgate 581, a momentarily increased lifting force is to be applied. Thus, an unintentional upward movement of the tailgate 581, e.g. by wind blow, can be avoided and, nevertheless, the upward movement of the tailgate 581 is facilitated. For downward movement it is necessary again to open the non-return valve 574 by applying a downward directed lowering force FN to the tailgate.

It is further to be noted that the locking devices of FIGS. 1 to 4 can also be used in constructions of the type of FIGS. 6 and 7 for facilitating the handling of a tailgate or a trunk lid, or an engine bonnet.

In case of using the device of FIG. 1 for a construction as shown in FIGS. 6 and 7, the piston rod extension 25 may be avoided and the working chambers 5 and 6 may be filled with pressurized gas. In case of FIG. 2, the partitions 160 and 165 may be avoided and the working chambers 105 and 106 may be filled with pressurized gas.

While specific embodiments of the invention have been shown and described in detail to illustrate the application of the inventive principles, it will be understood that the invention-may be embodied otherwise without departing from such principles.

I claim:

1. A system for fluid exchange between two working chambers, comprising:

a fluid conducting member in series between said two working chambers and containing a through flow chamber;

a movable sealing piston sealingly confining said through flow chamber adjacent one end thereof;

a first connection for connecting said through flow chamber to one of said working chambers;

a second connection for connecting said through flow chamber to the other of said working chambers;

sealing piston pretensioning means for pretensioning a first connection side end face of the sealing piston adjacent said one end of said through flow chamber into a closed position against the first connection;

the first connection side end face, when in the closed position, (i) presenting a smaller fluid-exposed cross section to a fluid pressure acting on it through the first connection and (ii) having a larger fluid-exposable cross section not always exposed to said fluid pressure acting through the first connection;

said second connection communicating with the other working chamber via a pressure drop path;

said through flow chamber permitting the establishment of a flow path therethrough extending from said one working chamber to said other working chamber, said flow path through said through flow chamber being the sole flow path permitting fluid flow between said working chambers in the fluid exchange direction from said one chamber to said other working chamber so that, at a predetermined minimum pressure acting on the smaller fluid-exposed cross section of the first connection side end face, the first connection is opened, and subsequently the larger fluid-exposable cross section within the through flow chamber is exposed to a pressure which is dependent upon the rate of flow (mass per time unit) through the through flow chamber and maintains the first connection open until the through flow rate falls below a predetermined minimum.

2. A system for fluid exchange between two working chambers, comprising:

a fluid conducting member in series between said two working chambers and containing a through flow chamber;

a movable sealing piston sealingly confining said through flow chamber adjacent one end thereof;

a first connection for connecting said through flow chamber to one of said working chambers;

a second connection for connecting said through flow chamber to the other of said working chambers;

sealing piston pretensioning means for pretensioning a first connection side end face of the sealing piston adjacent said one end of said through flow chamber into a closed position against the first connection;

the first connection side end face, when in the closed position, (i) presenting a smaller fluid-exposed cross section to a fluid pressure acting on it through the first connection and (ii) having a larger fluid-exposable cross section not always exposed to said fluid pressure acting through the first connection;

said second connection communicating with the other working chamber via a pressure drop path;

said through flow chamber permitting the establishment of a flow path therethrough extending from said one working chamber to said other working chamber, said flow path through said through flow chamber being the sole flow path permitting fluid flow between said working chambers in the fluid exchange direction from said one chamber to said other working chamber so that, at a predetermined minimum pressure acting on the smaller fluid-exposed cross section of the first connection side end face, the first connection is opened, and subsequently the larger fluid-exposable cross section within the through flow chamber is exposed to a pressure which is dependent upon the rate of flow (mass per time unit) through the through flow chamber and maintains the first connection open until the through flow rate falls below a predetermined minimum; and means for normally preventing fluid flow in the direction from said other working chamber to said one working chamber and being responsive to the occurrence of a predetermined pressure differential between said other working chamber and said one working chamber to allow fluid flow from said other working chamber to said one working chamber.

3. A fluid exchange system according to claims 1 or 2, wherein:

the fluid conducting member is located substantially concentrically within a cylindrical cavity;

said first connection extends in the direction of the axis of the cylindrical cavity and communicates with a first connection chamber;

said first connection chamber being connected to said one working chamber; and said second connection being disposed substantially radially in relation to the axis of the cylindrical cavity and connected to an annular connecting line which extends between the fluid conducting member and an inner peripheral surface of the cylindrical cavity toward the other working chamber.

4. A fluid exchange system according to claim 1, wherein the pressure drop path is formed by the second connection constructed as a bore.

5. A fluid exchange system according to claim 3, wherein the first connection and the second connection are separated from each other by an annular gasket which is formed between an outer peripheral face of the fluid conducting member and an inner peripheral surface of the cylindrical cavity.

6. A fluid exchange system according to claims 1 or 2, wherein the fluid conducting member is disposed within a separating piston unit disposed inside a cylindrical tube.

7. A fluid exchange system according to claims 1 or 2, wherein the sealing piston pretensioning means is at least partially formed by a coil thrust spring.

8. A fluid exchange system according to claim 1, wherein the sealing piston pretensioning means is accommodated in a closed chamber which is constructed inside the fluid conducting member.

9. A fluid exchange system according to claim 1, wherein:

fluid flow occurs therethrough in opposite flow directions between said working chambers; and in a first direction of through flow, the first connection acts as an input while the second connection acts as an output and, in a second direction of through flow, the second connection serves as an input while the first connection acts as an output of the fluid exchange system.

10. A fluid exchange system according to claim 2, wherein:

the means for normally preventing flow comprises a non-return valve constructed as a slide valve; and the fluid conducting member is constructed as a slide valve member within a cylindrical cavity, is pretensioned into a closing position and can be moved into an opening position by a pressure derived from the pressure in the other working chamber.

11. A cylinder-piston unit with at least one fluid exchange system according to claims 1 or 2, wherein a separating piston unit separates said two working chambers from each other within a cylindrical tube of the cylinder-piston unit, said fluid exchange system being adapted to allow fluid exchange between said two working chambers.

12. A cylinder-piston unit with two fluid exchange systems according to claim 1, disposed in series within a separating piston unit between the two working chambers of the cylinder-piston unit, with the respective first connection of the two fluid exchange systems being connected to each other and with the second connections of the two fluid exchange systems being connected to respective working chambers of the cylinder piston unit.

13. A cylinder-piston unit according to claim 12, wherein:

with the two series connected fluid exchange systems the separating piston unit is accommodated within a cylindrical tubular cavity which is closed at its two ends by respective-guiding and sealing units; and a piston rod connected to the separating piston unit is guided in sealing-tight manner through one of the guiding and sealing units and a piston rod extension connected to the separating piston unit is guided through the other of the guiding and sealing units.

14. A cylinder-piston unit according to claim 11, wherein:

the separating piston unit is accommodated within a cylindrical tubular cavity which is closed over its entire cross-section at one end and has only at its other end a guiding and sealing unit; and a piston rod is connected to the separating piston unit and is guided through the guiding and sealing unit; and means are provided for compensating for the variation in the displacement volume of the piston rod within the cylindrical tubular cavity upon displacement of the piston rod in relation to the cylindrical tubular cavity, which means generate a push-out force on the piston rod.

15. A cylinder-piston unit according to claim 14, wherein:

in the presence of only one single fluid exchange system Within the separating piston unit the first connection thereof is connected to a working chamber on the piston rod side of the cylindrical tubular cavity, hereinafter referred to as the rod chamber;

the second connection of this fluid exchange system is connected to a working chamber of the cylinder-piston unit on the side remote from the piston rod and which is hereinafter referred to as the end chamber.

16. A cylinder-piston unit according to claim 15, wherein:

when the rod chamber and the end chamber are filled with an incompressible fluid, the end chamber is subdivided by a stationary separating wall unit into a partial end chamber close to the piston rod and a partial end chamber remote from the piston rod;

adjacent the partial end chamber remote from the piston rod there is a resiliently compressible compensating space; and there is in the stationary separating wall-unit a further fluid exchange system such that its first connection is connected to the partial end chamber which is close to the piston rod.

17. A cylinder-piston unit according to claim 14, wherein:

a hollow piston body of the separating piston unit is connected to the piston rod which bears in a sealing-tight manner against an inner peripheral wall of the cylindrical tubular cavity;

the fluid conducting member of the fluid exchange system is accommodated inside this hollow piston body in such a way that the first connection of the through flow chamber communicates with a working chamber at the piston rod side, referred to as the rod chamber, of the cylindrical tubular cavity;

the fluid conducting member as a slide valve member cooperates with the hollow piston body to form a non-return valve which is conductive from a working chamber of the cylindrical tubular cavity which is remote from the piston rod, referred to as the end chamber, to the working chamber at the piston rod side.

18. A structural sub-assembly comprising, as a basic structure, a motor vehicle construction and, as a movable structural element, one of a flap or hood which is adapted for a movement guided by guide means against the force of gravity between an extreme lower position and an extreme upper position in relation to the basic structure, whereby to facilitate movement of the movable structural element between the extreme lower position and the extreme upper position and in order to arrest the movable structural element in intermediate positions, at least one cylinder-piston unit filled with a pressurized fluid is provided, whereby furthermore the cylinder-piston unit is constructed with a cylindrical tube, a tubular cavity constructed inside the cylindrical tube, a guiding and sealing unit at one end of the tubular cavity, a sealing-tight closure at the other end of the tubular cavity, a piston rod inserted through the guiding and sealing unit, a separating piston unit connected to the piston rod inside the tubular cavity, a rod chamber on the piston rod side of the separating piston unit, an end chamber on the side of the separating piston unit which is remote from the piston rod, and a filling of pressurized fluid in the rod chamber and in the end chamber, whereby furthermore means are provided for compensating for variations in the displacement volume of the piston rod inside the tubular cavity upon displacement of the piston rod in relation to the tubular cavity which generates a push-out force on the piston rod, whereby, furthermore, a fluid exchange system is provided between the rod chamber and the end chamber, whereby, furthermore, of the cylindrical tube and the piston rod, one is connected to the basic structure while the other is connected to the movable structural element and whereby the weight and the guide means of the movable structural element, the points of attack between the cylinder-piston unit, the basic structure and the movable structural element, the cross-section ($Q1$) of the tubular cavity, the cross-section ($Q3$) of the piston rod, the fluid filling in the tubular cavity and the fluid exchange system are so constructed and dimensioned that the following conditions are satisfied:

(a) when the movable structural element is in a midway position, at rest, the end chamber and the rod chamber are separated from each other and the movable structural element is secured against sinking by an end chamber fluid contained in the end chamber and against rising by a rod chamber fluid contained in the rod chamber, in that aa) a pressure ($P1$) of the end chamber fluid bearing on a full cross-section ($Q1$) of the separating piston unit exerts a push-out effect on the separating piston unit, ab) by this push-out effect in the rod chamber a pressure ($P2$) of the rod chamber fluid is generated which exerts on a differential cross-section ($Q2$) between the full cross-section ($Q1$) of the separating piston unit and a rod cross-section ($Q3$) of the piston rod a push-in effect on the separating unit, ac) the push-in effect generated by said pressure (P2) of the rod chamber fluid, together with an additional push-in effect (FG) emanating from the weight of the movable structural element maintains equilibrium with the push-out effect, the pressure (P2) in the rod chamber being greater than the pressure (P1) in the end chamber, ad) a lifting-purpose non-return valve system opening from the rod chamber to the end chamber is exposed to the pressure in the rod chamber with a smaller fluid exposed cross-section and is so adjusted that in a state of equilibrium it cannot be opened by the pressure in the rod chamber, ae) a lowering-purpose non-return valve system opening from the end chamber to the rod chamber is exposed to the pressure in the end chamber and is so adjusted that in a state of equilibrium it cannot be opened by the pressure in the end chamber;

b) a brief slight application of an external lifting Force (FH) on the movable structural element results in an increase in the pressure in the rod chamber which acts on the smaller fluid exposed cross-section of the lifting-purpose non-return valve system, thus effecting an opening of the lifting-purpose non-return valve system;

ba) once the lifting-purpose non-return valve system is opened, there is a flow of fluid from the rod chamber to the end chamber;

bb) the flow from the rod chamber to the end chamber suffers a drop in pressure in a pressure drop path situated between the lifting-purpose non-return valve system and the end chamber, bc) as a result of this pressure drop, there is established at the lifting-purpose non-return valve system an intermediate pressure (PZ) which is greater than the pressure in the end chamber; this intermediate pressure (PZ) acts on a larger fluid-exposed cross-section of the lifting-purpose non-return valve system in an opening sense as to the lifting-purpose non-return valve system; as a result of the fluid flow from the rod chamber through the lifting-purpose non-return valve system to the end chamber, the pressure in the rod chamber drops; the balance is modified and the piston rod is pushed out of the cylindrical tube;

bd) the pushing of the piston rod out of the cylindrical tube brings about a continued flow from the rod chamber to the end chamber; this continued flow continues to ensure maintenance of an intermediate pressure (PZ) at the lifting-purpose non-return valve system; this intermediate pressure (PZ) furthermore acts on the larger fluid-exposed cross-section of the lifting-purpose non-return valve system and holds it open, even when the exertion of external lifting force (FH) ceases; the pushing-out movement of the piston rod and thus the raising of the movable structural element are therefore continued by the action of the cylinder piston unit, without the need for the continued application of an external lifting force (FH);

be) if during the continued push-out movement of the piston rod a depressing force (FN) is briefly applied to the movable structural element, then the rate of flow (mass per time unit) through the lifting-purpose non-return valve system drops; the intermediate pressure (PZ) acting on the larger fluid-exposed cross-section of the lifting-purpose non-return valve system drops; the lifting-purpose non-return valve system is closed again; the movable structural element comes to a standstill and remains stationary even if the depressing force (FN) ceases again;

c) when the movable structural element is in an intermediate position and at rest, it can be moved by a minor lowering force (FS) in the direction of the extreme lower position in that ca) firstly there is an increase in the pressure (P1) in the end chamber, a slight increase in the pressure (P1) in the end chamber being sufficient for opening the lowering-purpose non-return valve system, cb) consequently there is an approximation of pressures between the end chamber and the rod chamber, and cc) the pressure acting on the piston rod cross-section (Q3) and prevailing in the rod chamber and the end chamber once this approximation of pressure is established between the two chambers produces a force to push the piston rod out which only slightly exceeds the gravity-induced piston rod push-in effect of the movable structural element on the piston rod, so that it can be overcome by said minor lowering force (FS) to be permanently applied until a desired lower position of the movable structural member has been reached.

19. A fluid exchange system according to claim 1, wherein said sealing piston pretensioning means is at least partly derived from a fluid pressure in the other working chamber.

20. A cylinder-piston unit according to claim 14, wherein said means for compensating for the variation in the displacement volume of the piston rod within the cylindrical tubular cavity and for generating a push-put force on the piston rod comprises a pressurized gas within said cylindrical tubular cavity.

21. A cylinder-piston unit according to claim 14, wherein one of said piston rod and said cylindrical tube is connected to a basic structure and the other is connected to a movable structural element guided by guide means in relation to the basic structure and is movable between a lower position and an upper position with respect to said basic structure against the action of gravity.

22. A cylinder-piston unit according to claim 21, wherein said basic structure is a motor vehicle and said movable structural element is a flap or hood of said vehicle.

* * * * *

UNITED STATES PATENT AND TRADEMARK OFFICE
CERTIFICATE OF CORRECTION

PATENT NO. : 5,620,066

DATED : April 15, 1997

INVENTOR(S) : Oliver Schüttler

It is certified that error appears in the above-identified patent and that said Letters Patent is hereby corrected as shown below:

Col. 3, line 40, "than then" should read --that then--;
Col. 12, line 6, "fluid" should read --liquid--;
Col. 18, line 38, "dependant" should read --dependent--;
Col. 18, line 40, "to with" should read --to--;
Col. 22, line 32, "effort. cross-section" should read --effort.--;
Col. 29, line 40, "578m" should read --578,--;
Col. 32, claim 3, line 1, "claims" should read --claim--;
Col. 32, claim 6, line 1, "claims" should read --claim--;
Col. 32, claim 7, line 1, "claims" should read --claim--;
Col. 33, claim 12, line 4, "connection" should read --connections--;
Col. 33, claim 15, line 3, "Within" should read --within--;
Col. 35, line 19, "Force" should read --force--.

Signed and Sealed this

Fourth Day of November, 1997

*Attest:*

BRUCE LEHMAN

*Attesting Officer*  *Commissioner of Patents and Trademarks*